United States Patent [19]
Asano et al.

[11] Patent Number: 5,548,695
[45] Date of Patent: Aug. 20, 1996

[54] IMAGE FIGURE EDITING SYSTEM FOR MANIPULATING FIGURE ELEMENTS GIVEN IN TERMS OF IMAGE DATA

[75] Inventors: Mieko Asano; Osamu Hori, both of Kanagawa-ken, Japan

[73] Assignee: Kabushiki Kaisha Toshiba, Kawasaki, Japan

[21] Appl. No.: 69,108

[22] Filed: May 28, 1993

[30] Foreign Application Priority Data

May 29, 1992 [JP] Japan .................................. 4-138183

[51] Int. Cl.⁶ ..................................................... G06T 5/00
[52] U.S. Cl. ......................... 395/133; 395/150; 395/151; 382/259
[58] Field of Search .................................. 395/133–139, 395/142, 145, 146, 155, 160, 161, 600, 650, 150, 151; 382/41, 44, 259

[56] References Cited

U.S. PATENT DOCUMENTS

| | | | |
|---|---|---|---|
| 4,748,443 | 5/1988 | Uehara et al. ........................... | 382/259 |
| 5,027,304 | 6/1991 | Jeng et al. .............................. | 395/150 |
| 5,287,417 | 2/1994 | Eller et al. ............................. | 382/41 |
| 5,327,501 | 7/1994 | Kato et al. ............................. | 382/44 |

*Primary Examiner*—Almis R. Jankus
*Attorney, Agent, or Firm*—Oblon, Spivak, McClelland, Maier, & Neustadt, P.C.

[57] ABSTRACT

An image figure editing system capable of manipulating figure elements given in terms of the image data in a substantially similar manner as the editing of the figure elements given in terms of the vector data. In the system, the position data to specify the figure elements to be operated in the figure are inputted, one of operation modes is specified, characteristics indicative of a shape of the figure are extracted, and features of the figure are determined according to the extracted characteristics, by carrying out an operation indicated by the specified operation mode to the figure elements specified by the inputted position data. In addition, an image of the figure is modified according to the determined features and the extracted characteristics, by carrying out the operation indicated by the specified operation mode to the figure elements specified by the inputted position data.

18 Claims, 32 Drawing Sheets

- POSITION COORDINATE INPUT — 16
- END POINT CANDIDATE POINT SEQUENCE EXTRACTION — 17
- END POINT COORDINATE OUTPUT — 18

- POSITION COORDINATE INPUT — 19
- STRAIGHT LINE SEGMENT DETECTION — 22
- BENDING POINT CANDIDATE POINT SEQUENCE EXTRACTION — 20
- BENDING POINT COORDINATE OUTPUT — 21

- 26 POSITION COORDINATE INPUT
- 27 STRAIGHT LINE SEGMENT DETECTION
- 28 NEARBY LINE SEGMENT DETECTION
- 29 CENTRAL LINE DETERMINATION
- 30 INTERSECTION COORDINATE OUTPUT

- 35 POSITION COORDINATE INPUT
- 36 STRAIGHT LINE SEGMENT DETECTION
- 37 LINE CENTER CALCULATION
- 38 LINE CENTER OUTPUT

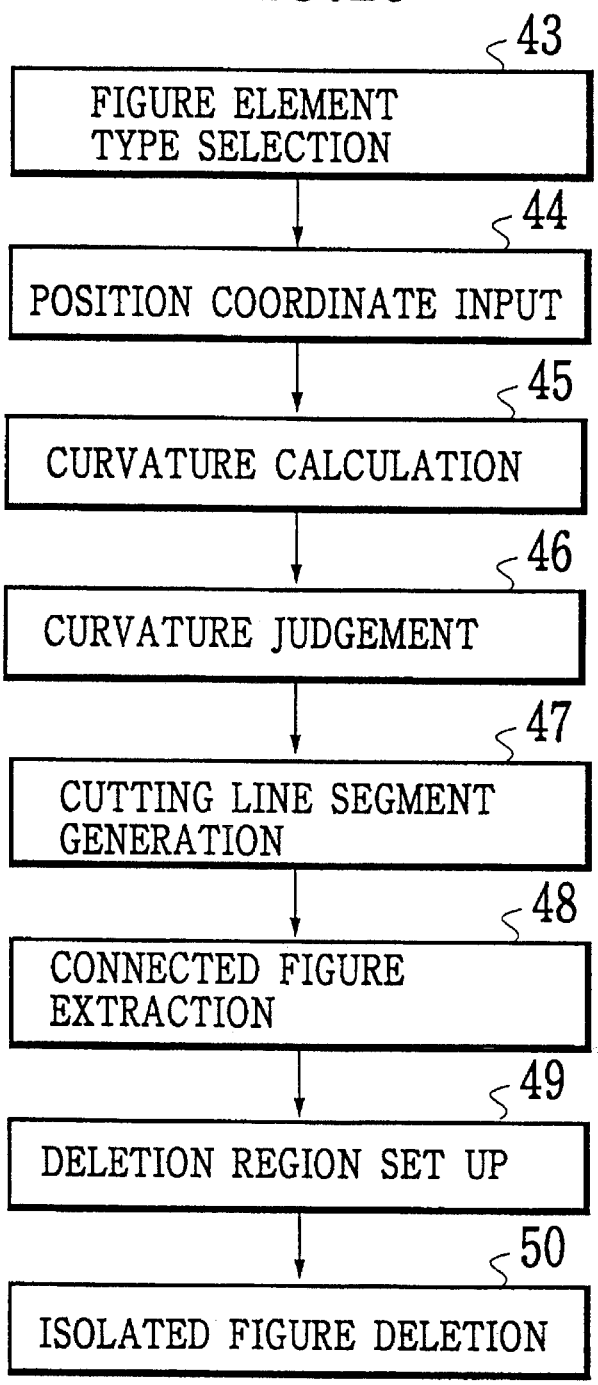
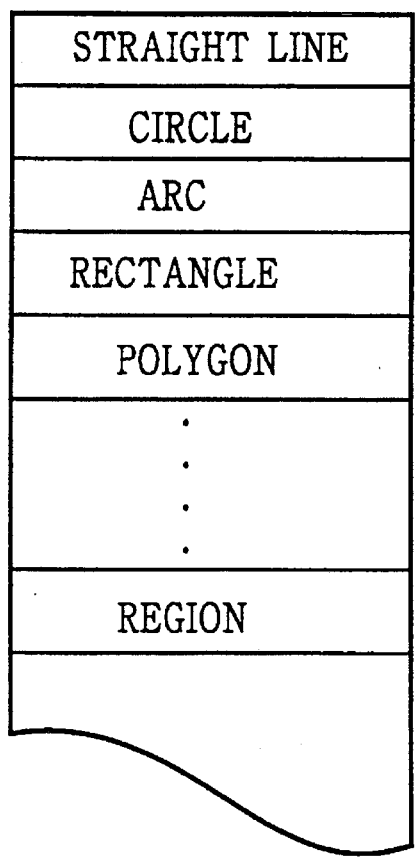

FIG.25E
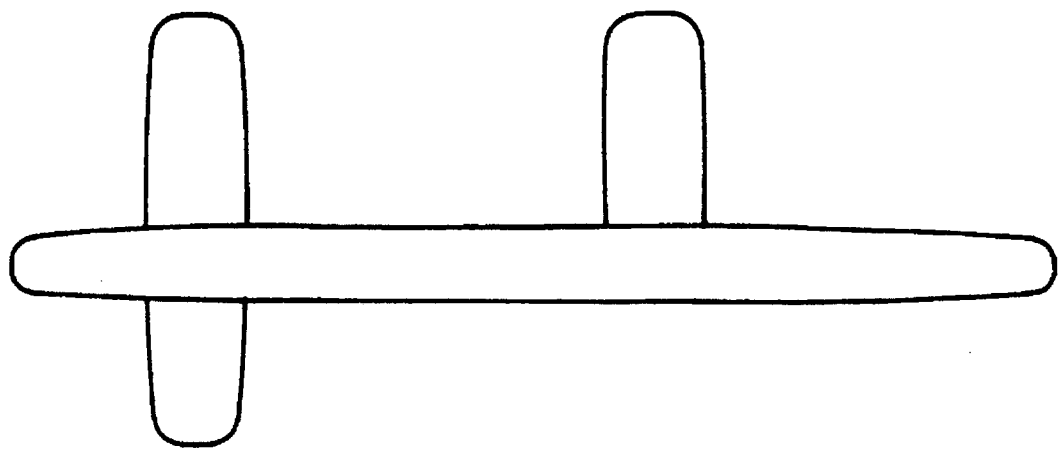
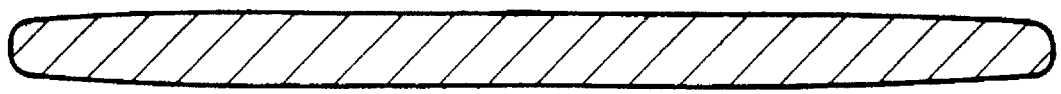

IMAGE FIGURE EDITING SYSTEM FOR MANIPULATING FIGURE ELEMENTS GIVEN IN TERMS OF IMAGE DATA

BACKGROUND OF THE INVENTION

1. Field of the Invention

The present invention relates to an image figure editing system for enabling an efficient editing of figure elements of displayed image figures in a CAD/CAM system or a geographical data management system.

2. Description of the Background Art

There has been an increasing use of an image filing system such as an optical filing system equipped with an image scanner for the purpose of managing various handwritten or printed drawings such as maps and design specifications. In such an image filing system, an editing of figures in the drawing stored in terms of image data has been limited to simple addition and deletion using a pen and an eraser, as the manipulation of the figure elements given in terms of the image data has been severely limited compared with that of the ordinary CAD data in which individual figure elements are expressed in terms of numerically specified vector data. Similarly, in a CAD system using both the image data and the vector data, it has been impossible to treat the image data and the vector data equally.

As a consequence, in a conventional image filing system using the image data, the user is required to edit the figure elements given in terms of the image data very carefully to make appropriate additions and deletions in order to realize the desired editing operations such as rotation, expansion, contraction, and displacement of the figure elements, unlike the editing of the figure elements given in terms of the vector data in which the various editing operations mentioned above can be realized very easily by processing the vector data numerically.

Therefore, in a conventional image filing system using the image data, the user is required to distinguish the type of data in terms of which each figure is given and treat figures given in terms of different types of data differently at a time of editing the displayed drawing, which makes the editing operations on the image filing system to be extremely complicated to an extent that the levels of efficiency and accuracy achievable in the editing operations are inevitably limited to rather unsatisfactory levels.

SUMMARY OF THE INVENTION

It is therefore an object of the present invention to provide an image figure editing system capable of manipulating figure elements given in terms of the image data in a substantially similar manner as the editing of the figure elements given in terms of the vector data, so as to improve the efficiency and accuracy achievable in the editing operations.

According to one aspect of the present invention there is provided an image figure editing system for manipulating figure elements of a figure to be edited given in terms of image data, comprising: position data input means for inputting position data to specify the figure elements to be operated in the figure; operation mode specifying means for specifying one of operation modes; characteristic extraction means for extracting characteristics indicative of a shape of the figure; and feature determination means for determining features of the figure according to the characteristics extracted by the characteristic extraction means, by carrying out an operation indicated by the operation mode specified at the operation mode specifying means to the figure elements specified by the position data inputted at the position data input means.

According to another aspect of the present invention there is provided a method of image figure editing for manipulating figure elements of a figure to be edited given in terms of image data, comprising the steps of: inputting position data to specify the figure elements to be operated in the figure; specifying one of operation modes; extracting characteristics indicative of a shape of the figure; and determining features of the figure according to the characteristics extracted at the extracting step, by carrying out an operation indicated by the operation mode specified at the specifying step to the figure elements specified by the position data inputted at the inputting step.

Other features and advantages of the present invention will become apparent from the following description taken in conjunction with the accompanying drawings.

BRIEF DESCRIPTION OF THE DRAWINGS

FIG. 19 is a flow chart for the operation to be carried out by the system of FIG. 1 in a case of a deletion operation.

FIG. 20 is an illustration of an exemplary figure element type menu to be used in the system of FIG. 1.

FIGS. 25A to 25E are illustrations of an exemplary image of a figure during the displacement operation according to the flow chart of FIG. 23.

DETAILED DESCRIPTION OF THE PREFERRED EMBODIMENTS

Figure 1:
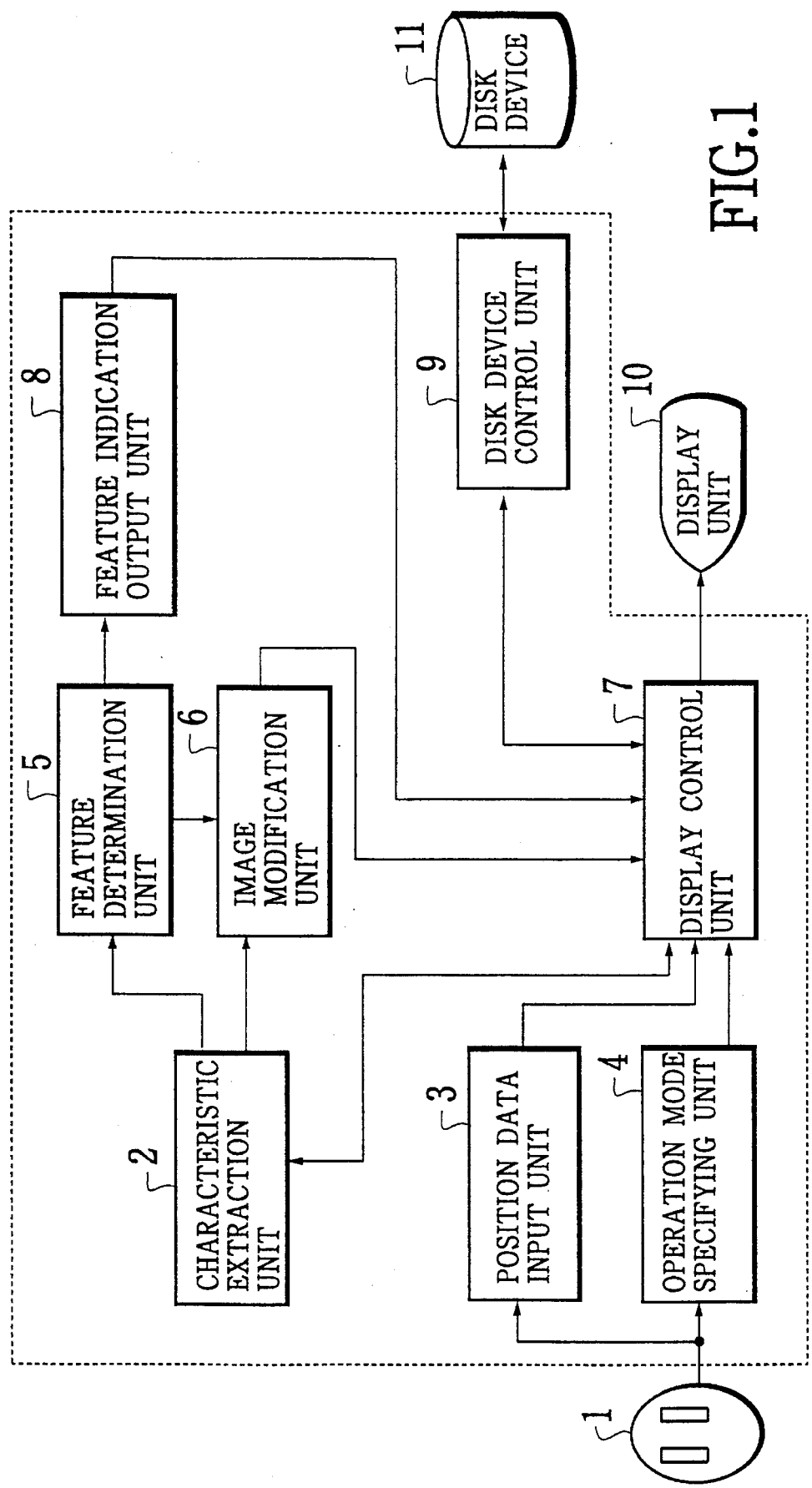
FIG. 1 is a schematic block diagram of one embodiment of an image figure editing system according to the present invention.

Referring now to FIG. 1, one embodiment of an image figure editing system according to the present invention will be described in detail.

In this embodiment, the system comprises: an input device 1 such as a mouse to be operated by an operator; a position data input unit 3 for entering a position data from the input device 1; an operation mode specifying unit 4 for specifying an operation mode from the input device 1; a characteristic extraction unit 2 for extracting characteristics of a figure in a vicinity of the position indicated by the entered position data by carrying out the operation indicated by the specified operation mode; a feature determination unit 5 for determining features of the figure according to the extracted characteristics; an image modification unit 6 for modifying the image of the figure according to the extracted characteristics and the determined features; a feature indication output unit 8 for outputting an indication to be displayed for the determined features; a display control unit for controlling a display unit 10 such as CRT to display the image of the figure modified by the image modification unit 6 or the image of the figure along with the indication outputted from the feature indication output unit 8; and a disk device control unit 9 for controlling a disk device 11 for storing the images of the figures to be edited; where the display control unit 7 is connected with each one of the characteristic extraction unit 2, the position data input unit 3, the operation mode specifying unit 4, the image modification unit 6, the feature indication output unit 8, and the disk device control unit 9.

More specifically, the disk device 11 stores the image data for the figures such as line figures, symbols, and letters, which can be loaded to and stored from the display control unit 7 under the control by the disk device control unit 9. The display control unit 7 can control the display unit 10 to display the image of the figure loaded from the disk device 11 or to be stored into the disk device 11.

The input device 1 is used by an operator on one hand in entering the position data to be entered into the position data input unit 3, by specifying either a region to execute the operation or a target figure element to be processed. On the other hand, the input device 1 is also used by the operator in specifying the desired operation mode by selecting an appropriate entry from an operation mode menu as shown in FIG. 2, which is displayed on the display unit 10 under the control of the display control unit 7.

Figure 2:
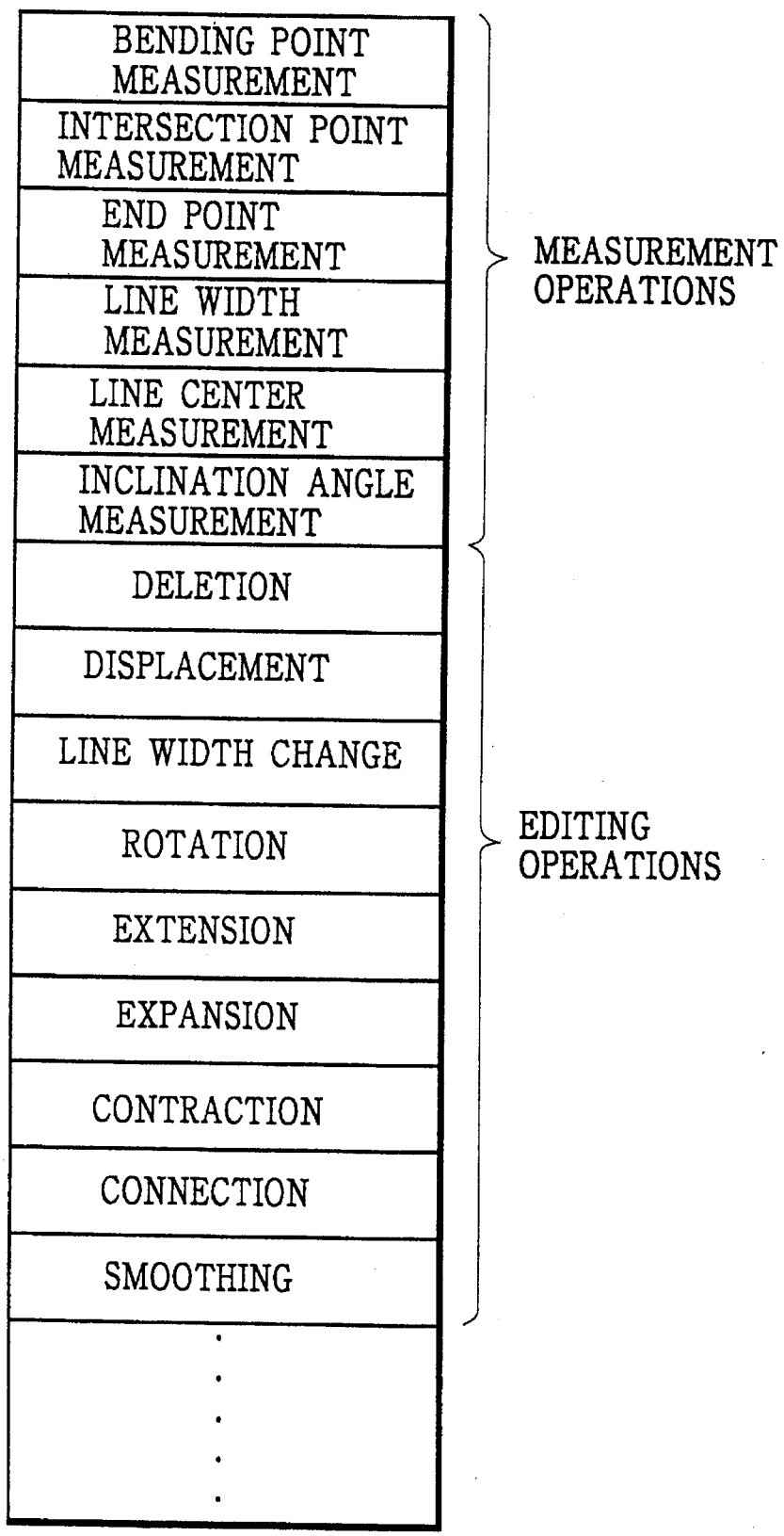
FIG. 2 is an Illustration of an exemplary operation mode menu to be used in the system of FIG. 1.

As shown in FIG. 2, in this embodiment, the operation modes include measurement operations for a bending point, an intersection point, an end point, a line width, a line center, and an inclination angle, as well as the editing operations of a deletion, a displacement, a line width change, a rotation, an extension, an expansion, a contraction, a connection, and a smoothing. The operation mode specified by using the input device 1 is recognized at the operation mode specifying unit 4, which controls the system to execute the appropriate operation corresponding to the specified operation mode.

Here, it is to be noted that the input device 1 may be provided in a form of a device other than the mouse as shown in FIG. 1, such as an electronic pen or a keyboard, so long as it is possible to realize the above described functions of the input device 1.

Figure 3A:
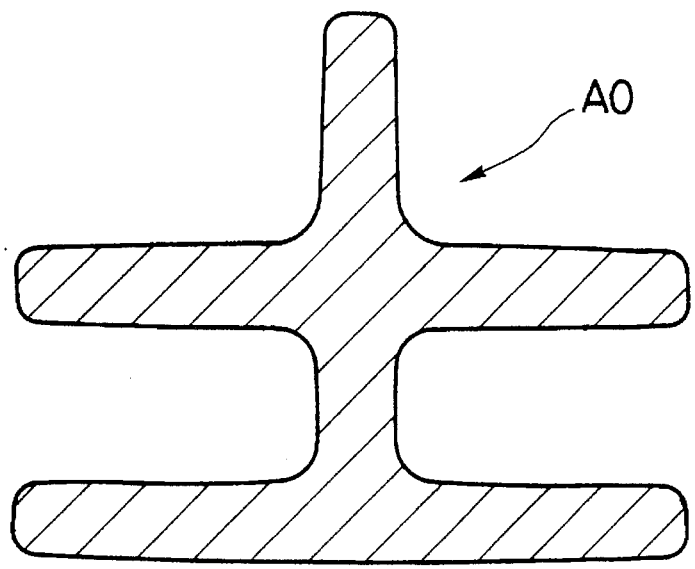
FIG. 3A is an illustration of an exemplary original image of a figure to be edited by the system of FIG. 1.
Figure 3B:
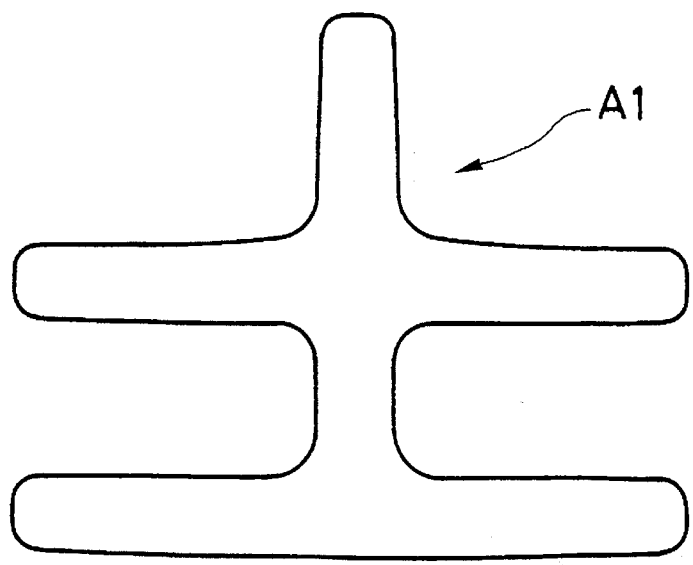
FIG. 3B is an illustration of a contour line for the original image of FIG. 3A.
Figure 3C:
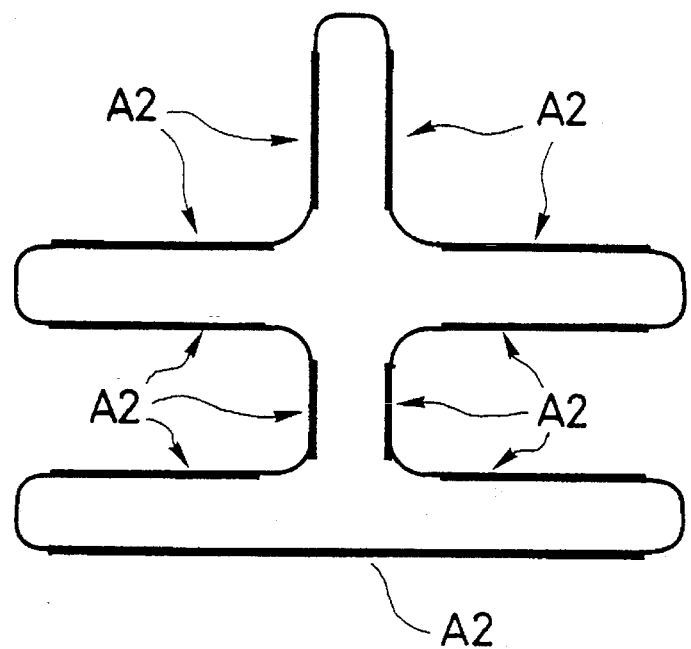
FIG. 3C is an illustration of a straight line approximation of a contour line for the original image of FIG. 3A.
Figure 3D:
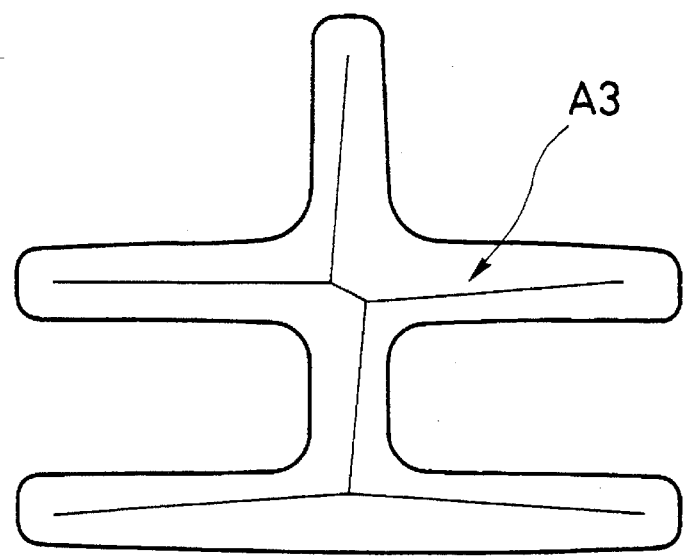
FIG. 3D is an illustration of a straight line approximation of a thinned line for the original image of FIG. 3A.

The characteristic extraction unit 2 extracts characteristics including characteristic points or characteristic point sequences which characterize the figure, as well as preliminary processing data obtained from an original image of the figure, from the characteristic points or characteristic point sequences can be derived. Here, the preliminary processing data can be given in any form indicative of a shape of the figure. The conventionally known forms for the preliminary processing data include a contour line, a thinned line, and their straight line approximations. For example, for the original image A0 of the figure shown in FIG. 3A, the contour line A1 appears as shown in FIG. 3B, the straight line approximation A2 of the contour line appears as shown in FIG. 3C, and the straight line approximation A3 of the thinned line appears as shown in FIG. 3D.

In a case of using the contour line A1 of FIG. 3B as the preliminary processing data, the extraction of the characteristic point sequences of the figure can then be carried out by the characteristic extraction unit 2 as follows.

First, the curvatures at points on the contour line A1 given in terms of chain codes are calculated. Here, for example, the curvature at a point of interest A can be calculated as an angle formed by two line segments joining this point of interest A with two other points B1 and B2 on the contour line A1 each of which is N picture elements distanced away from the point of interest A. It is to be noted here that any other known procedure for calculating the curvature at the point of interest A on the contour line A1 may be employed instead. It is also to be noted here that the curvatures to be utilized in this embodiment may not necessarily be the mathematically rigorously defined ones, and it suffices for the curvatures to be merely capable of indicating degrees at which the contour line is curved.

Figure 4:
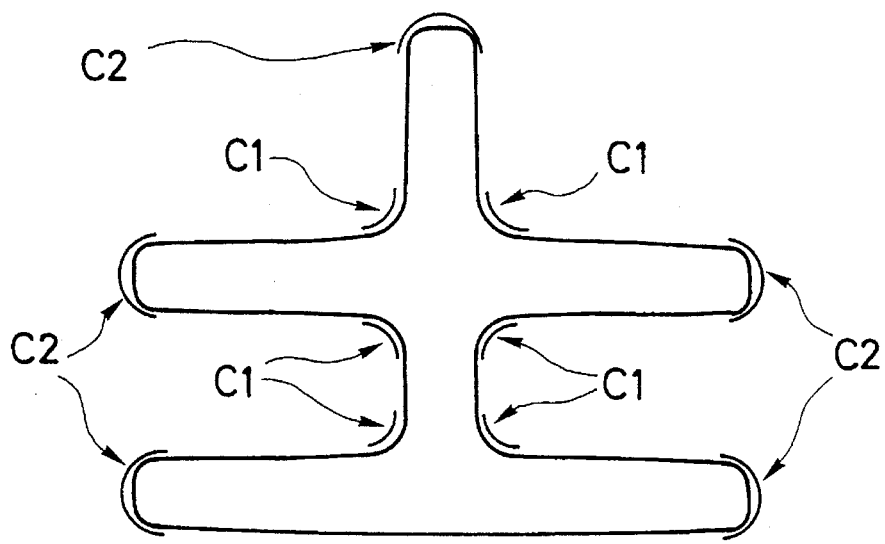
FIG. 4 is an illustration of characteristic point sequences obtained from the contour line of FIG. 3B.

Then, the characteristic point sequences of the figure are extracted according to the calculated curvature sequences. Here, for example, any point with the calculated curvature k less than or equal to a prescribed threshold K0 (i.e., $k \leq K0$) can be regarded as a member of a concave point sequence C1, while any point with the calculated curvature k greater than or equal to another prescribed threshold K1 (i.e., $k \geq K1$) can be regarded as a member of a convex point sequence C2, as shown in FIG. 4.

It is to be noted here that, in a case of using the thinned line as the preliminary processing data, the characteristic points can be obtained by regarding each end point of the thinned line as a convex point, and each intersection point as a concave point.

The feature determination unit 5 determines the features of the figure such as the bending point, intersection point, end point, line width, line center, and inclination angle, by image processing the preliminary processing data and the characteristic points or point sequences extracted by the characteristic extraction unit 2, according to the position data specified by the position data input unit 3 and the operation mode specified by the operation mode specifying unit 4, in the manners to be described in detail below. Here, depending on the position data specified by the position data input unit 3, the features can be obtained for the entire figure or any specified figure element of the figure.

The feature indication output unit 8 then outputs the indication of the feature determined by the feature determination unit 5 either in a form of measurement data to be displayed along the image of the figure, or in a form of an indication marking to be depicted on the image of the figure. More specifically, when the specified operation mode is any one of the measurements of the bending point, end point, and intersection point, the coordinate of the obtained feature is outputted as the measurement data to the display control unit 7, whereas when the specified operation mode is any one of the measurements of the line width, line center, and inclination angle, the measured result for the obtained feature is outputted as the measurement data to the display control unit 7.

The image modification unit 6 modifies the image of the figure by image processing the preliminary processing data and the characteristic points or point sequences extracted by the characteristic extraction unit 2, according to the position data specified by the position data input unit 3, the operation mode belonging to the editing operations specified by the operation mode specifying unit 4, and the features determined by the feature determination unit 5, in the manners to be described in detail below. Thus, when the specified operation mode is any one of the editing of the deletion, displacement, line width change, rotation, extension, expansion, contraction, connection, and smoothing, the appropriately modified image of the figure is outputted to the display control unit 7.

Now, the detailed operations to be carried out in the system of this embodiment for each one of the operation modes including the measurement operations for a bending point, an intersection point, an end point, a line width, a line center, and an inclination angle, as well as the editing operations of a deletion, a displacement, a line width change, a rotation, an extension, an expansion, a contraction, a connection, and a smoothing, will be described in detail.

<<End point measurement>>

Figure 5:
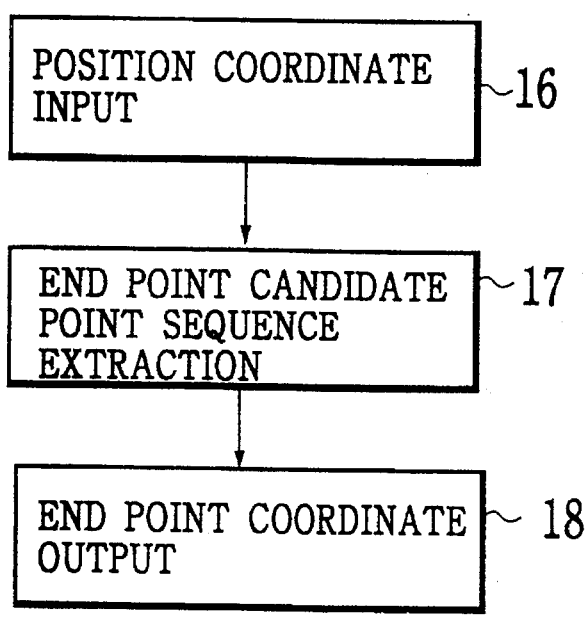
FIG. 5 is a flow chart for the operation to be carried out by the system of FIG. 1 in a case of an end point measurement operation.

First, FIG. 5 shows a flow chart for the operations in a case of the end point measurement.

Figure 6:
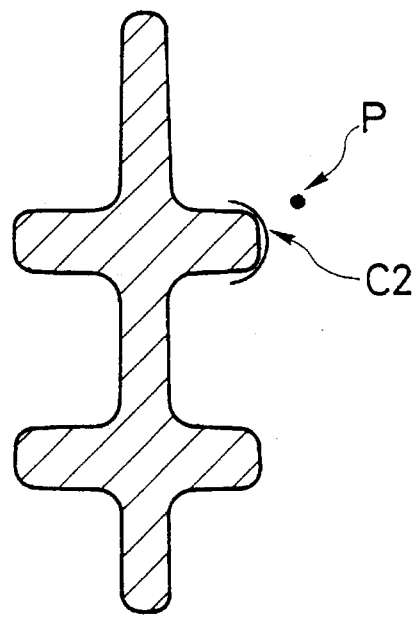
FIG. 6 is an illustration of an exemplary image of a figure during the end point measurement operation according to the flow chart of FIG. S.

In this case, first at the step 16, the position coordinate for a target specifying point P as indicated in FIG. 6 is inputted from the position data input unit 3 as the input position data.

Then, at the step 17, the convex point sequence C2 closest to the target specifying point P specified at the step 16 as indicated in FIG. 6 is extracted by the feature determination unit 5 from the characteristic point sequences obtained by the characteristic extraction unit 2 as an end point candidate point sequence.

Finally, at the step 18, the coordinate of the end point is determined by the feature determination unit 5 and outputted from the feature indication output unit 8 according to the convex point sequence C2 extracted at the step 17. Here, the coordinate of the end point can be determined by using the points of the extracted convex point sequence C2 as samples, calculating a circle with respect to which the square errors of these samples can be minimized, and regarding a center of the calculated circle as the end point, for example.

Any other conventionally known method for obtaining the end point coordinate such as that which utilizes the straight line segments in a vicinity of the target specifying point may be utilized instead.

<<Bending point measurement>>

Figure 7:
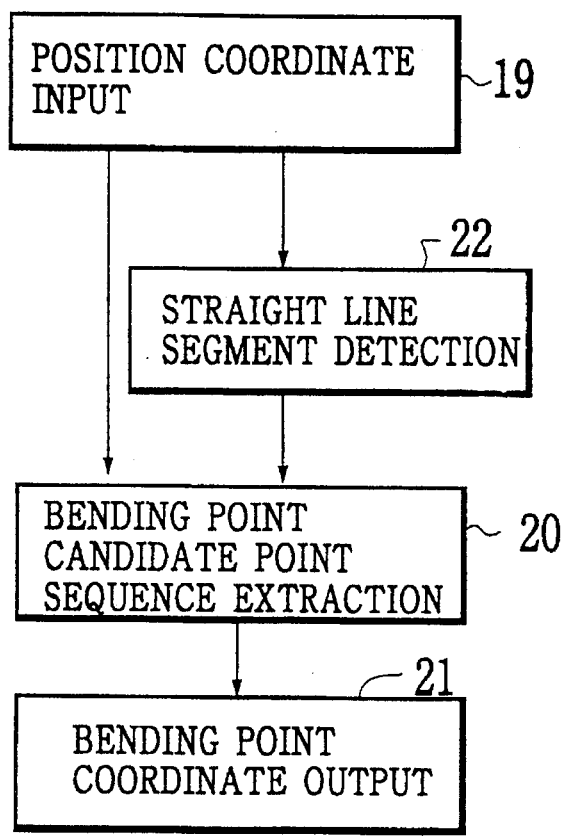
FIG. 7 is a flow chart for the operation to be carried out by the system of FIG. 1 in a case of a bending point measurement operation.

Next, FIG. 7 shows a flow chart for the operations in a case of the bending point measurement.

Figure 8A:
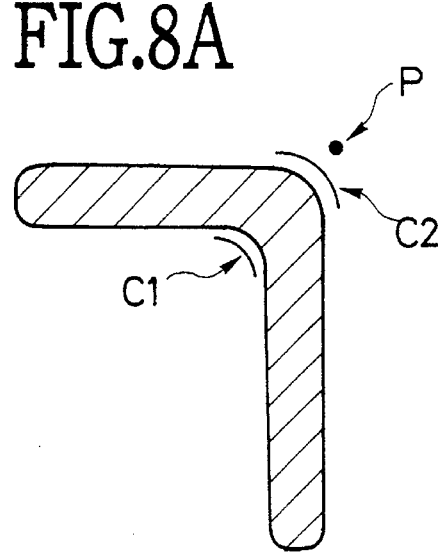
FIGS. 8A, 8B, and 8C are illustrations of an exemplary image of a figure during the bending point measurement operation according to the flow chart of FIG. 7.

In this case, first at the step 19, the position coordinate for a target specifying point P as indicated in FIG. 8A is inputted from the position data input unit 3 as the input position data.

Then, at the step 20, the convex point sequence C2 closest to the target specifying point P specified at the step 19 and the concave point sequence C1 paired with that convex point sequence C2 as indicated in FIG. 8A are extracted by the feature determination unit 5 from the characteristic point sequences obtained by the characteristic extraction unit 2 as bending point candidate point sequences.

Finally, at the step 21, the coordinate of the bending point is determined by the feature determination unit S and outputted from the feature indication output unit 8 according to the convex point sequence C2 and the concave point sequence C1 extracted at the step 20. Here, the coordinate of the bending point can be determined by using the points of the extracted convex point sequence C2 and concave point sequence C1 as samples, calculating a circle with respect to which the square errors of these samples can be minimized, and regarding a center of the calculated circle as the bending point, for example.

Any other conventionally known method for obtaining the bending point coordinate such as that which utilizes the straight line segments in a vicinity of the target specifying point may be utilized instead.

Figure 8B:
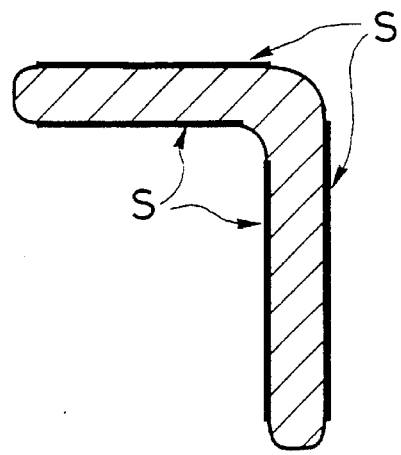
Figure 8C:
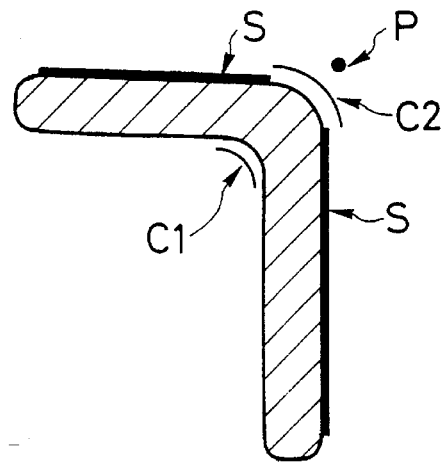

For example, as an alternative to the above described procedure, after the step 19, the straight line segments S neighboring the convex point sequence C2 and the concave point sequence C1 as indicated in FIG. 8B are detected by the feature determination unit 5 from the preliminary processing data obtained by the characteristic extraction unit 2 at the step 22, such that the point sequence located between those straight line segments S which have the end points closest to the target specifying point P specified at the step 19 is extracted by the feature determination unit 5 as the bending point candidate point sequence at the step 20, and the coordinate of the bending point is determined by the feature determination unit 5 and outputted from the feature indication output unit 8 according to the coordinates of the extracted bending point candidate point sequence at the step 21, as indicated in FIG. 8C.

<<Intersection point measurement>>

Figure 9:
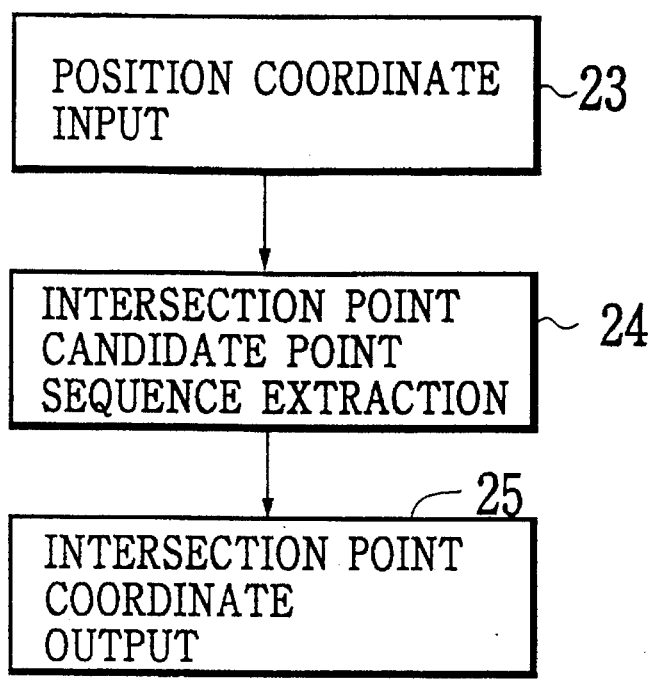
FIG. 9 is a flow chart for the operation to be carried out by the system of FIG. 1 in a case of an intersection point measurement operation.

Next. FIG. 9 shows a flow chart for the operations in a case of the intersection point measurement.

In this case, first at the step 23, the position coordinate for a target specifying point in a vicinity of a desired intersection portion is inputted from the position data input unit 3 as the input position data.

Figure 10:
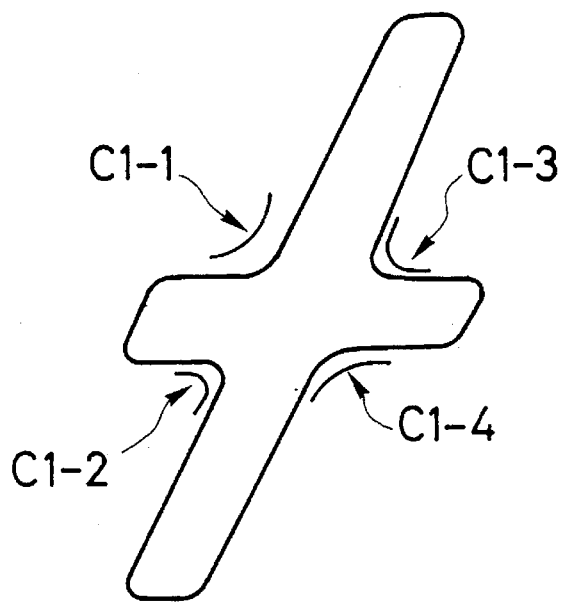
FIG. 10 is an illustration of an exemplary image of a figure during the intersection point measurement operation according to the flow chart of FIG. 9.

Then, at the step 24, the concave point sequences C1-1 to C1-4 located in a vicinity of the target specifying point specified at the step 23 as indicated in FIG. 10 are extracted by the feature determination unit 5 from the characteristic point sequences obtained by the characteristic extraction unit 2 as intersection point candidate point sequences.

Finally, at the step 25, the coordinate of the intersection point is determined by the feature determination unit 5 and outputted from the feature indication output unit 8 according to the concave point sequences C1-1 to C1-4 extracted at the step 24. Here, the coordinate of the intersection point can be determined by using the points of the extracted concave point sequences C1-1 to C1-4 as samples, calculating a circle with respect to which the square errors of these samples can be minimized, and regarding a center of the calculated circle as the intersection point, for example.

Any other conventionally known method for obtaining the intersection point coordinate such as that which utilizes the straight line segments in a vicinity of the target specifying point may be utilized instead.

Figure 11:
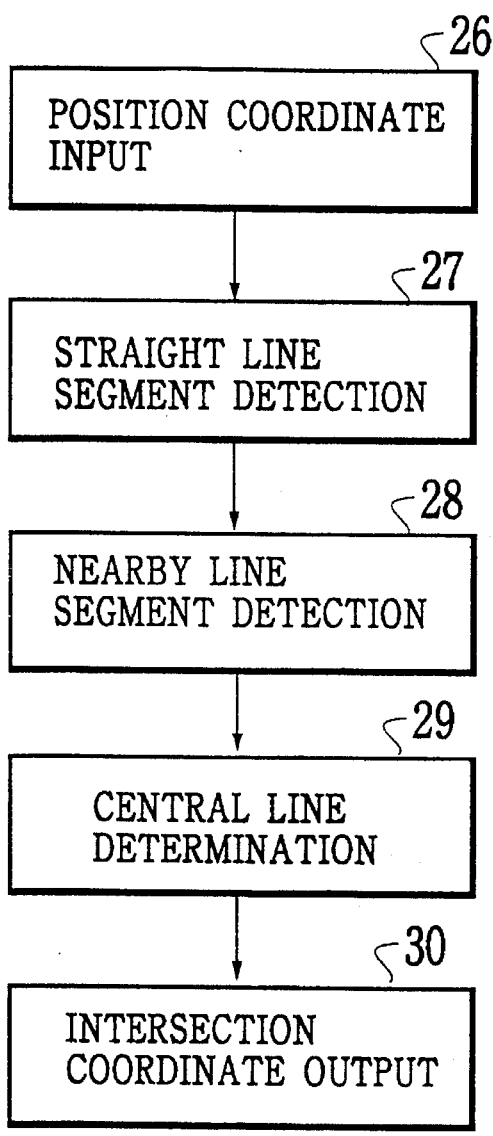
FIG. 11 is a flow chart for the alternative operation to be carried out by the system of FIG. 1 in a case of an intersection point measurement operation.

For example, FIG. 11 shows a flow chart for the alternative procedure for the operations in a case of the intersection point measurement.

In this case, first at the step 26, the position coordinates for two target specifying points P indicating two figure elements involved in a desired intersection portion is inputted from the position data input unit 3 as the input position data.

Then, at the step 27, the straight line segments S joining the convex and concave point sequences of the figure as indicated in FIG. 8B are detected by the feature determination unit 5 from the preliminary processing data obtained by the characteristic extraction unit 2.

Then, at the step 28, those straight line segments S which are located nearby the two target specifying points P specified at the step 26 are detected by the feature determination unit 5 from the straight line segments S detected at the step 27.

Figure 12A:
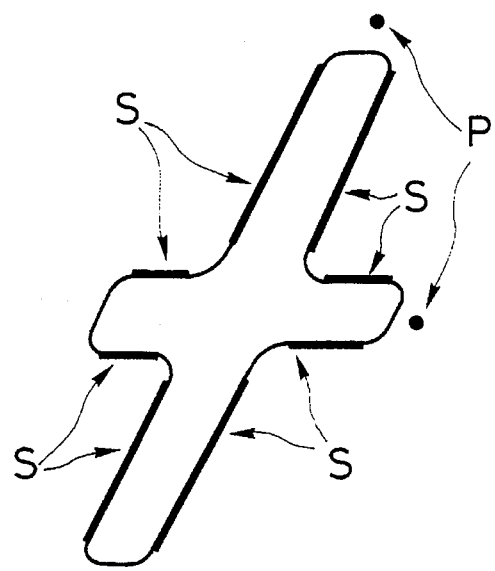
FIGS. 12A and 12B are illustrations of an exemplary image of a figure during the intersection point measurement operation according to the flow chart of FIG. 11.
Figure 12B:
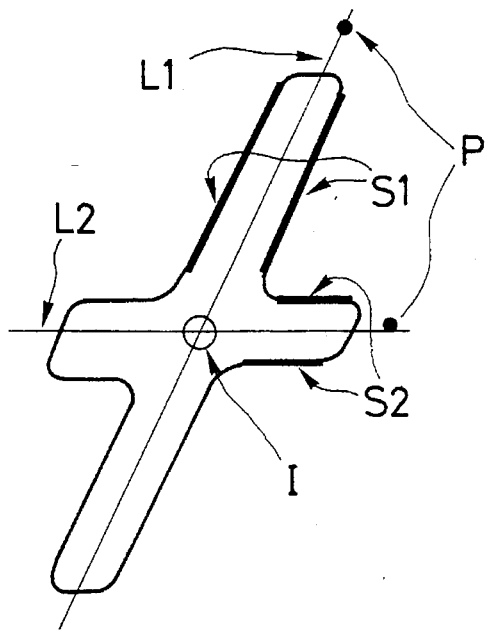

Then, at the step 29, the central lines L1 and L2 of the pair of the detected nearby straight line segments S1 and S2, respectively, as indicated in FIG. 12B, are determined by the feature determination unit 5.

Finally, at the step 30, the coordinate of the intersection point is determined by the feature determination unit 5 and outputted from the feature indication output unit 8 as an intersection of the central lines L1 and L2 determined at the step 29 as indicated in FIG. 12B.

<<Line width measurement>>

Figure 13:
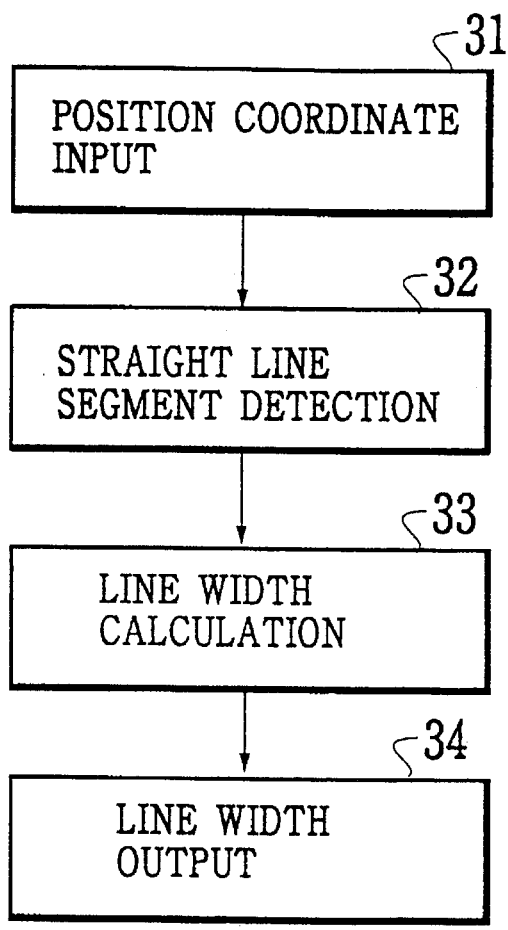
FIG. 13 is a flow chart for the operation to be carried out by the system of FIG. 1 in a case of a line width measurement operation.

Next, FIG. 13 shows a flow chart for the operations in a case of the line width measurement.

Figure 14A:
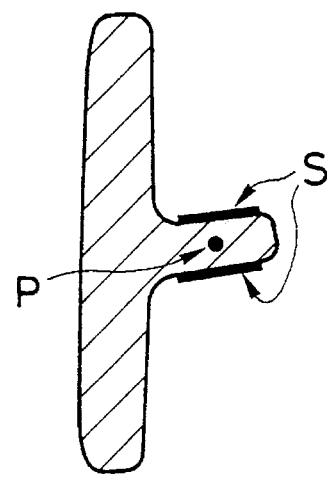
FIGS. 14A and 14B are illustrations of an exemplary image of a figure during the line width measurement operation according to the flow chart of FIG. 13.

In this case, first at the step 31, the position coordinate for a target specifying point P in a vicinity of a desired portion whose line width is to be measured as indicated in FIG. 14A is inputted from the position data input unit 3 as the input position data.

Then, at the step 32, two mutually facing straight line segments S in a vicinity of the target specifying point P specified at the step 31 as indicated in FIG. 14A are detected by the feature determination unit 5 from the preliminary processing data obtained by the characteristic extraction unit 2.

Figure 14B:
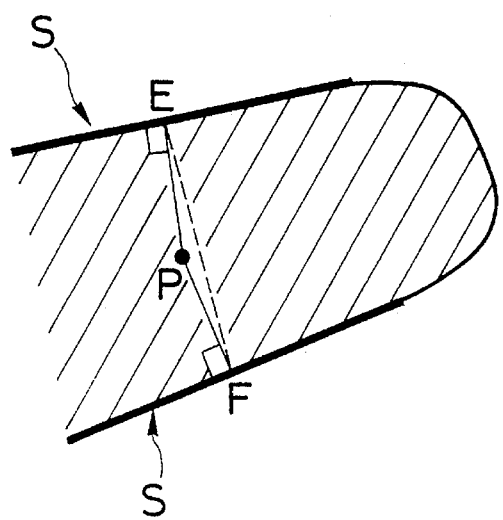

Then, at the step 33, the line width of the portion sandwiched between the two straight line segments S detected at the step 32 is calculated by the feature determination unit 5 according to the position coordinate of the target specifying point P specified at the step 31. Here, for example, the line width can be calculated in a manner indicated in FIG. 14B, in which the perpendicular lines are drawn from the target specifying point P to the two straight line segments S and a length of a straight line Joining the intersections E and F of these perpendicular lines and the straight line segments S is regarded as the line width of the portion sandwiched between the two straight line segments. Here, it is to be noted that the contour line point sequences in vicinities of the intersections E and F may be utilized in calculating the line width instead.

Finally, at the step 34, the line width calculated by the feature determination unit 5 is outputted from the feature indication output unit 8.

Any other conventionally known method for obtaining the line width such as that which utilizes the point sequences in a vicinity of the target specifying point may be utilized instead.

<<Line center measurement>>

Figure 15:
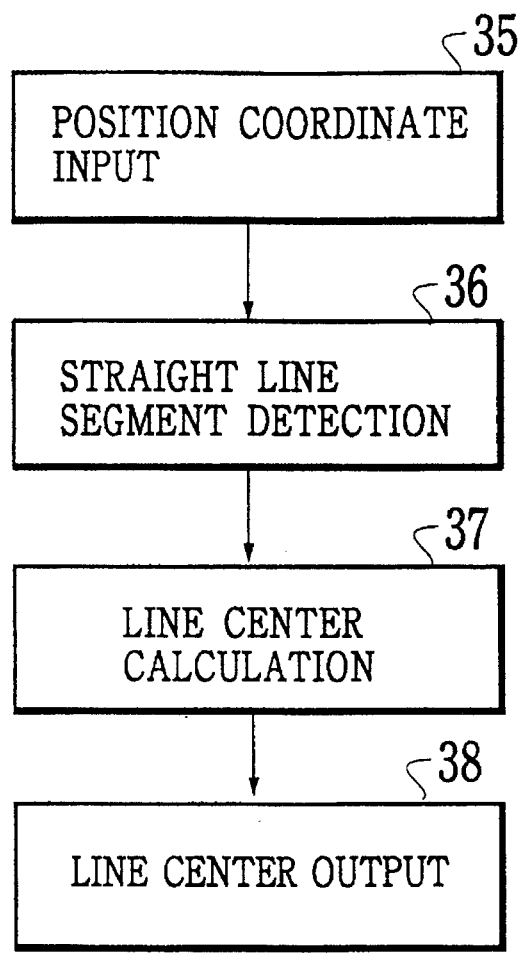
FIG. 15 is a flow chart for the operation to be carried out by the system of FIG. 1 in a case of a line center measurement operation.

Next, FIG. 15 shows a flow chart for the operations in a case of the line center measurement.

Figure 16:
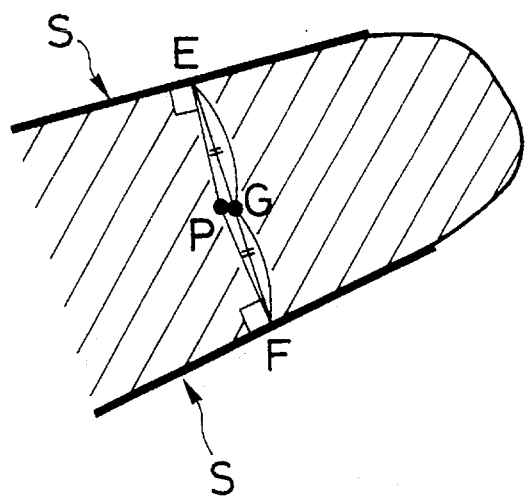
FIG. 16 is an illustration of an exemplary image of a figure during the line center measurement operation according to the flow chart of FIG. 15.

In this case, first at the step 35, the position coordinate for a target specifying point P in a vicinity of a desired portion whose line center is to be measured as indicated in FIG. 16 is Inputted from the position data input unit 3 as the input position data.

Then, at the step 36, two mutually facing straight line segments S in a vicinity of the target specifying point P specified at the step 35 as indicated in FIG. 16 are detected by the feature determination unit 5S from the preliminary processing data obtained by the characteristic extraction unit 2.

Then, at the step 37, the line center of the portion sandwiched between the two straight line segments S detected at the step 32 is calculated by the feature determination unit 5 according to the position coordinate of the target specifying point P specified at the step 31. Here, for example, the line center can be calculated in a manner indicated in FIG. 16, in which the perpendicular lines are drawn from the target specifying point P to the two straight line segments S and a middle point of a straight line joining the intersections E and F of these perpendicular lines and the straight line segments S is regarded as the line center of the portion sandwiched between the two straight line segments. Here, it is to be noted that the contour line point sequences in vicinities of the intersections E and F may be utilized in calculating the line center instead.

Finally, at the step 38, the line center calculated by the feature determination unit 5 is outputted from the feature indication output unit 8.

Any other conventionally known method for obtaining the line center such as that which utilizes the point sequences in a vicinity of the target specifying point may be utilized instead.

<<Inclination angle measurement>>

Figure 17:
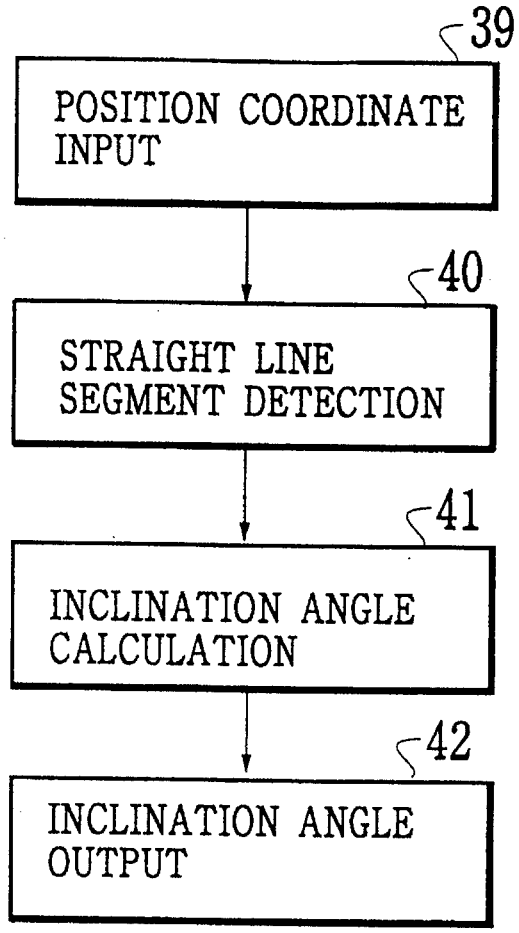
FIG. 17 is a flow chart for the operation to be carried out by the system of FIG. 1 in a case of an inclination angle measurement operation.

Next, FIG. 17 shows a flow chart for the operations in a case of the inclination angle measurement.

Figure 18:
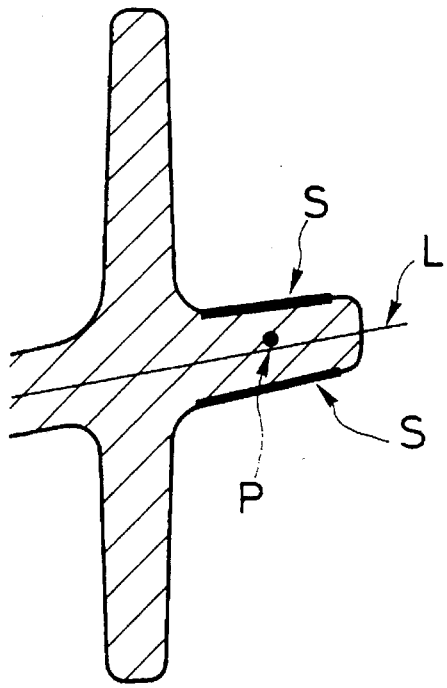
FIG. 18 is an illustration of an exemplary image of a figure during the inclination angle measurement operation according to the flow chart of FIG. 17.

In this case, first at the step 39, the position coordinate for a target specifying point P in a vicinity of a desired portion whose inclination angle is to be measured as indicated in FIG. 18 is inputted from the position data input unit 3 as the input position data.

Then, at the step 40, two mutually facing straight line segments S in a vicinity of the target specifying point P specified at the step 39 as indicated in FIG. 18 are detected by the feature determination unit 5 from the preliminary processing data obtained by the characteristic extraction unit 2.

Then, at the step 41, the inclination angle of the portion sandwiched between the two straight line segments S detected at the step 32 is calculated by the feature determination unit 5 according to the two straight line segments detected at the step 40. Here, for example, the inclination angle can be calculated as indicated in FIG. 18, by using the four end points of the two straight line segments S detected at the step 40 as samples, calculating a straight line with respect to which the square errors of these samples can be minimized, and regarding an inclination angle of the calculated straight line as the inclination angle of the portion sandwiched by the two straight line segments S, for example. Any other conventionally known method for obtaining the intersection point coordinate may be utilized instead. Here, it is to be noted that the contour line point sequences in a vicinity of the target specifying point P may be utilized in calculating the inclination angle instead.

Finally, at the step 42, the inclination angle calculated by the feature determination unit 5 is outputted from the feature indication output unit 8.

Any other conventionally known method for obtaining the inclination angle such as that which utilizes the point sequences in a vicinity of the target specifying point may be utilized instead.

<<Deletion>>

Next, FIG. 19 shows a flow chart for the operations in a case of the deletion.

In this case, first at the step 43, the type of the figure element to be deleted is selected by operating the input device 1 on a figure element type menu shown in FIG. 20 displayed on the display unit 10. In this embodiment, the figure element type menu of FIG. 20 includes items for various figure elements such as a straight line, a circle, an arc, a rectangle, and a polygon, as well as an item for a region in a case of deleting a region rather than the individual figure element.

Figure 21A:
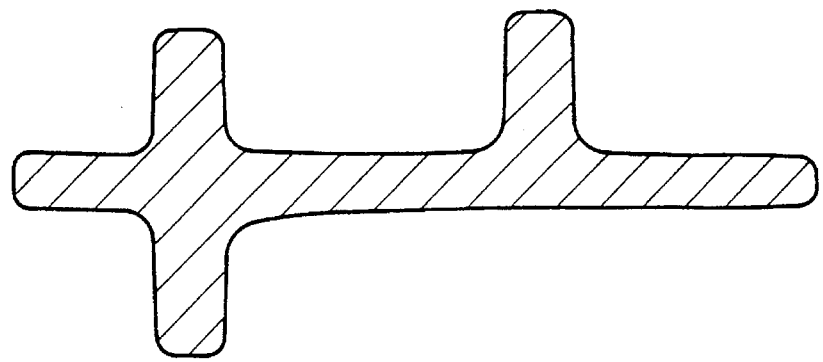
FIGS. 21A to 21G are illustrations of an exemplary image of a figure during the deletion operation according to the flow chart of FIG. 19.
Figure 21B:
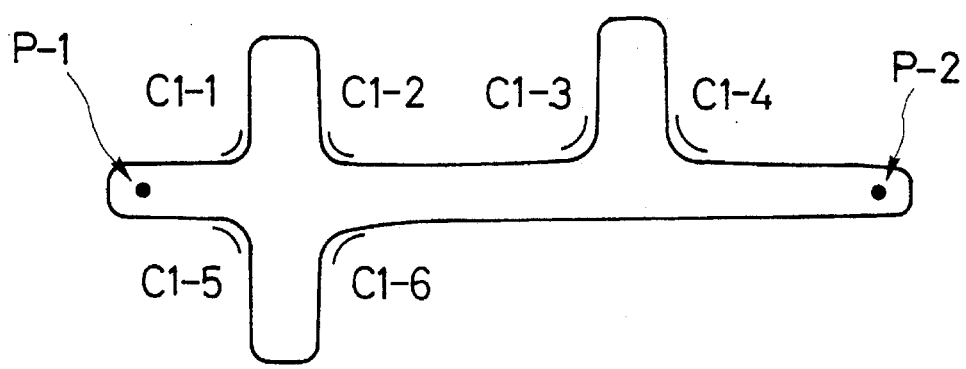

Then, at the step 44, the position coordinate for appropriate number of target specifying points are inputted from the position data input unit 3 as the input position data. For example, when the selected figure element type is the straight line, two target specifying points for identifying the straight line to be deleted can be required. Thus, for the original image of the figure shown in FIG. 21A, the transverse line segment can be identified by specifying the target specifying points P-1 and P-2 as shown in FIG. 21B. A different number of target specifying points may be required for any figure element type, if desired.

Then, at the step 45, the curvatures at the points on the contour line of the figure are calculated by the image modification unit 6, and at the step 46, the portions of the contour line with the large calculated curvatures are judged by the image modification unit 6 at the step 46. In the example shown in FIG. 21B, the concave point sequences C1-1 to C1-6 will be obtained as the large curvature portions at this step 46.

Figure 21C:
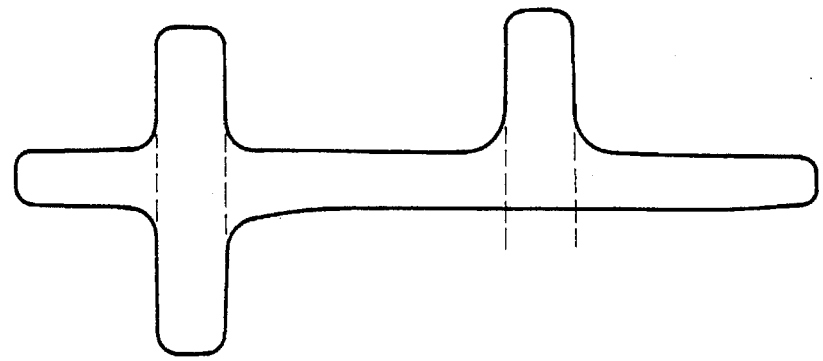

Then, at the step 47, the cutting line segments cutting through the transverse line segment to be deleted which are stemming from the large curvature portions obtained at the step 46 are generated by the image modification unit 6, as indicated by dashed lines in FIG. 21C.

Figure 21D:
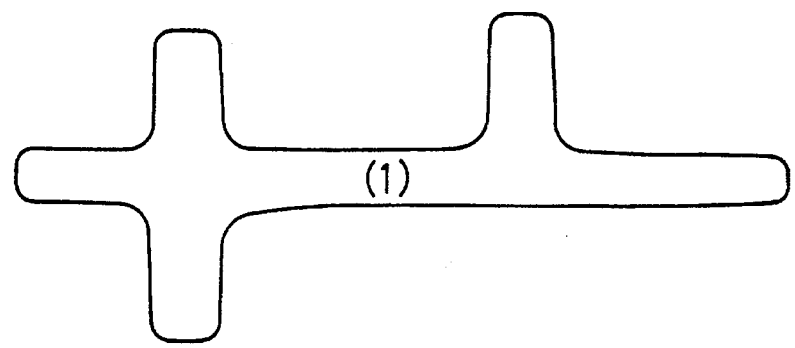
Figure 21E:
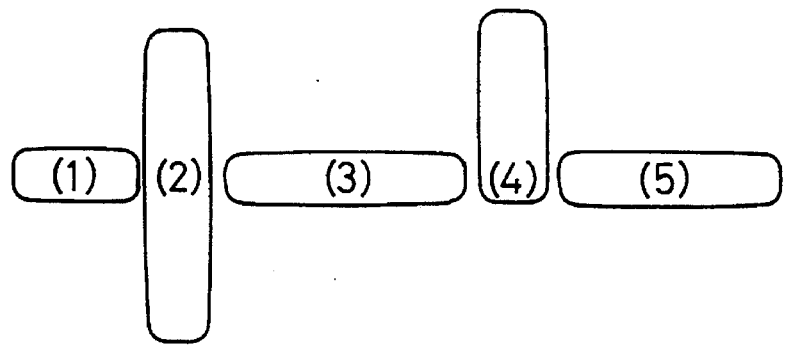

Then, at the step 48, the connected figures are extracted by the image modification unit 6 from this figure containing the transverse line segment to be deleted. Here, without the cutting line segment generation at the step 47, the connected FIG. (1) shown in FIG. 21D would be extracted as a sole connected figure. However, as the cutting line segments are generated at the step 47, the connected figures extracted at this step 48 are the five connected FIGS. (1) to (5) as indicated in FIG. 21E.

Figure 21F:
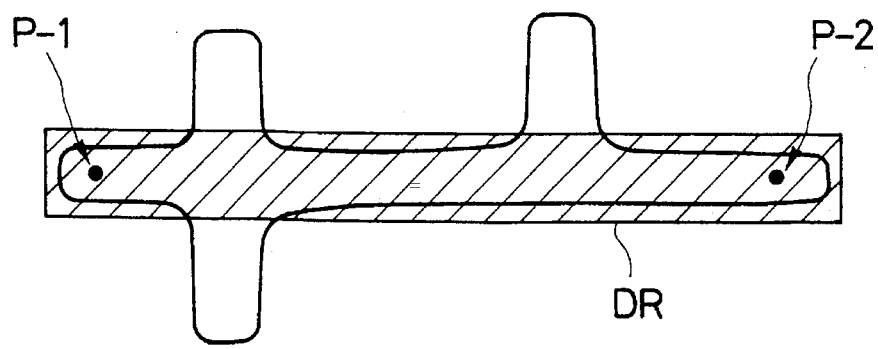

Then, at the step 49, a deletion region DR for carrying out the deletion operation containing the transverse line segment to be deleted is set up by the image modification unit 6 as shown in FIG. 21F.

Figure 21G:
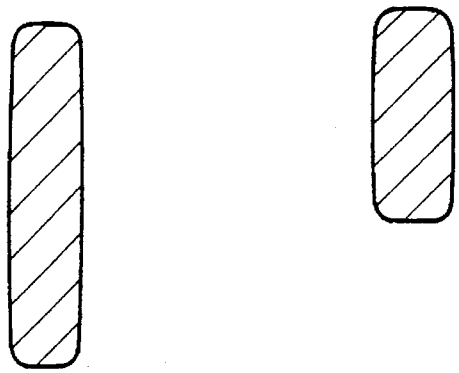

Finally, at the step 50, the isolated figures located entirely within the deletion region DR set up at the step 49 are deleted from the display by the image modification unit 6, leaving only those figures which are not entirely contained within the deletion region DR set up at the step 49, as shown in FIG. 21G.

Figure 22A:
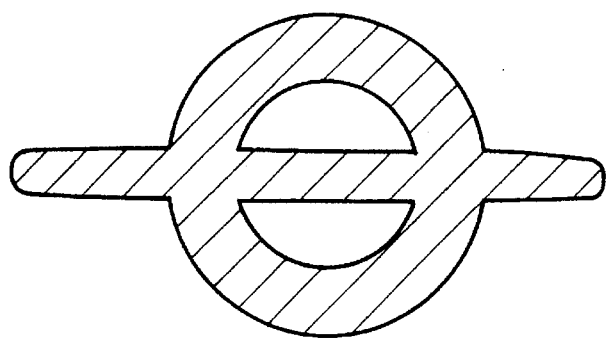
FIGS. 22A and 22B are illustrations of another exemplary image of a figure during the deletion operation according to the flow chart of FIG. 19.
Figure 22B:

FIG. 22A shows another exemplary figure to be edited, in which a circular figure element can be deleted as shown in FIG. 22B in the manner substantially similar to that described above.

<<Displacement>>

Figure 23:
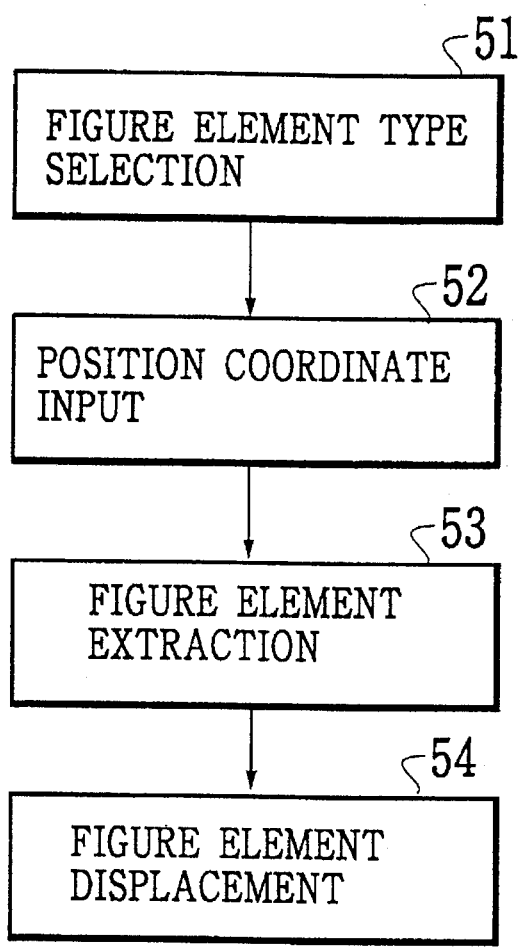
FIG. 23 is a flow chart of an overall procedure for the operation to be carried out by the system of FIG. 1 in a case of a displacement operation.

Next, FIG. 23 shows a flow chart for the operations in a case of the displacement.

In this case, first at the step 51, the type of the figure element to be deleted is selected by operating the input device 1 on the figure element type menu shown in FIG. 20 described above which is displayed on the display unit 10.

Then, at the step 52, the position coordinate for appropriate number of target specifying points are inputted from the position data input unit 3 as the input position data. Here, again, when the selected figure element type is the straight line, two target specifying points for identifying the straight line to be deleted can be required, whereas when the selected figure element type is a circle, one or more points target specifying points on the circle can be required. A different number of target specifying points may be required for any figure element type, if desired. Also, in a case of selecting the region in the figure element type menu of FIG. 20, the target specifying points for identifying the desired regions can be inputted at this step 52, irrespective of the shape of the figure. In addition, at this step 52, the position coordinate for a displacement target position to which the figure element is to be displaced is also inputted from the position data input unit 3.

Then, at the step 53, the figure element identified by the position coordinate inputted at the step 52 is extracted by the image modification unit 6, and then, at the step 54, the figure element extracted at the step 53 is displaced by the image modification unit 6 according to the position coordinate for the displacement target position inputted at the step 52.

Figure 24:
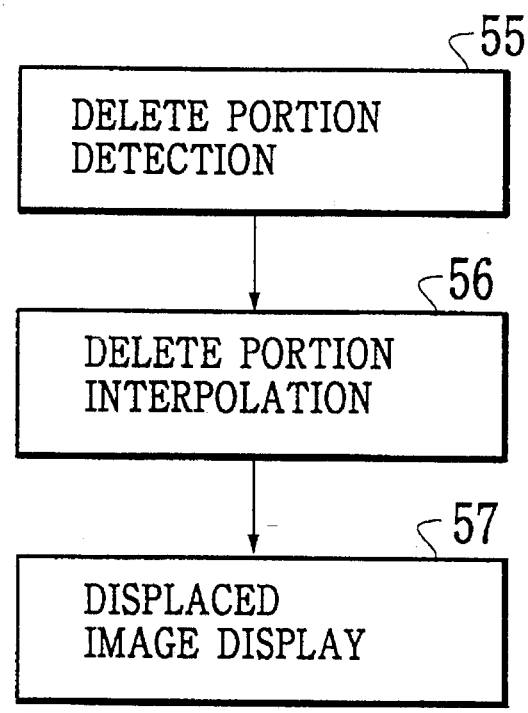
FIG. 24 is a flow chart for the operation to be carried out by the system of FIG. 1 at a figure element displacement step in the overall procedure of FIG. 23.

More specifically, the displacement of the figure element by the image modification unit 6 is carried out according to the flow chart of FIG. 24 as follows.

Figure 25A:
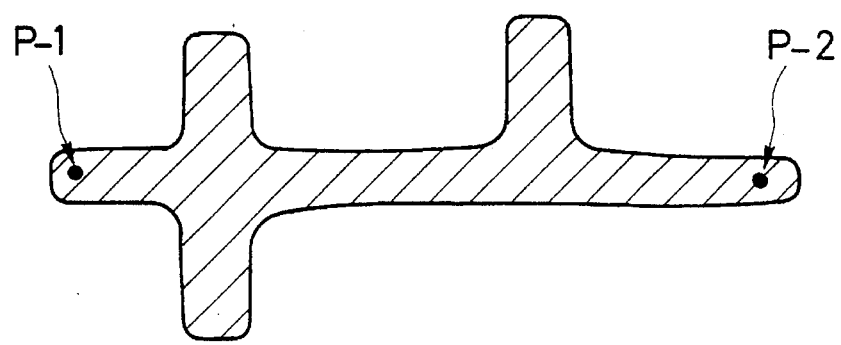
Figure 25B:
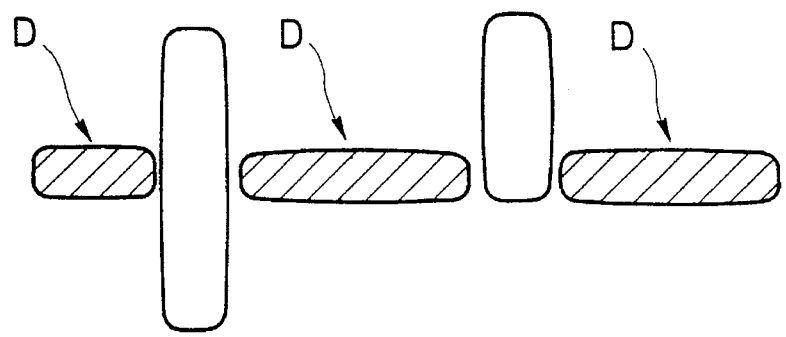

Namely, first at the step 55, the delete portions D to be deleted from the original image when the figure element specified at the step 52 is displaced are detected in the manner of the deletion operation described above. Thus, for the original image of the figure shown in FIG. 25A with the target specifying points P-1 and P-2 identifying the transverse line segment to be displaced, the delete portions D indicated in FIG. 25B are detected at this step 55. Here, it is to be noted that the different manner of achieving the detection of the delete portions D of the figure element may be adopted, if desired.

Figure 25C:
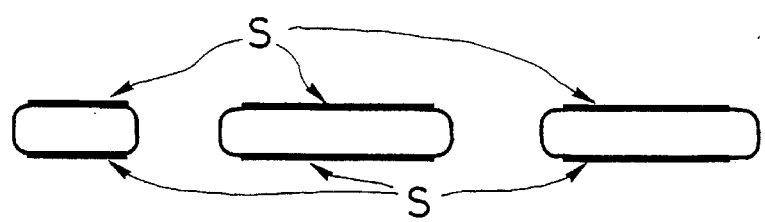
Figure 25D:

Then, at the step 56, the delete portions D detected at the step 55 are interpolated to form a single continuous figure element to be displaced. Here, the interpolation is carried out by detecting the straight line segments S of the delete portions D as shown in FIG. 25C, and then forming a single closed figure by interpolating between each neighboring straight line segments S as shown in FIG. 25D. The interpolation can be realized by connecting the end points of the neighboring straight line segments S, or by connecting the point sequences on the contour line obtained by the characteristic extraction unit 2.

Then, at the step 57, the delete portions D are deleted from the display on the display unit 10 while the interpolated figure element obtained at the step 56 is displayed at the displacement target position indicated by the position coordinate for the displacement target position inputted at the step 52, along with the undeleted portions of the figure, as shown in FIG. 25E.

It is to be noted here that, in the above described operation for the displacement, the delete portions D can be deleted from the display on the display unit 10 by changing the corresponding image data stored in a frame memory provided in the display control unit 7 from binary 1 to binary 0 or by replacing black data by white data. Similarly, the displaced figure element can be displayed at the displacement target position on the display of the display unit 10 by changing the corresponding image data stored in the frame memory provided in the display control unit 7 from binary 1 to binary 0 or by replacing white data by black data.

<<Rotation>>

Figure 26:
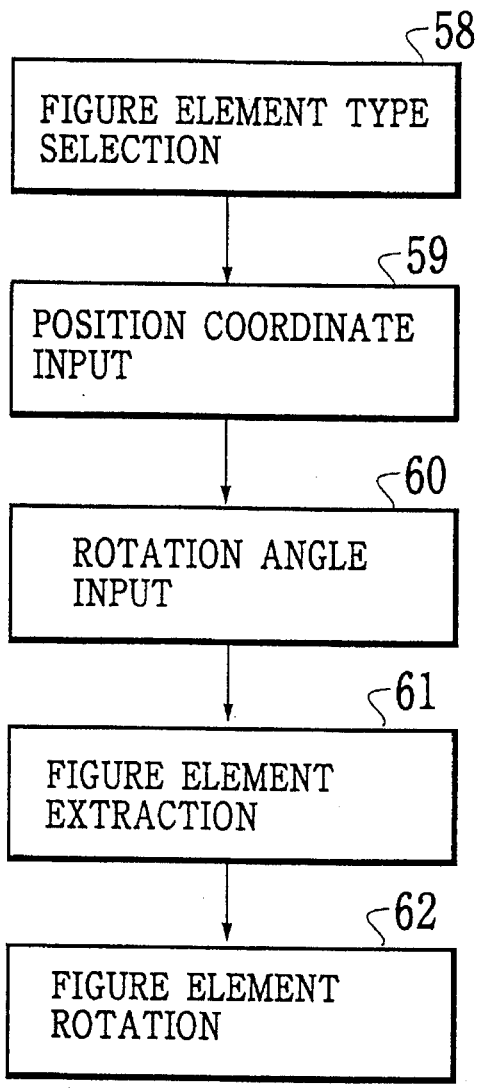
FIG. 26 is a flow chafe of an overall procedure for the operation to be carried out by the system of FIG. 1 in a case of a rotation operation.

Next, FIG. 26 shows a flow chart for the operations in a case of the rotation.

In this case, first at the step 58, the type of the figure element to be deleted is selected by operating the input device 1 on the figure element type menu shown in FIG. 20 described above which is displayed on the display unit 10.

Then, at the step 59, the position coordinate for appropriate number of target specifying points are inputted from the position data input unit 3 as the input position data. Here, again, when the selected figure element type is the straight line, two target specifying points for identifying the straight line to be deleted can be required, whereas when the selected figure element type is a circle, one or more points target specifying points on the circle can be required. A different number of target specifying points may be required for any figure element type, if desired. Also, in a case of selecting the region in the figure element type menu of FIG. 20, the target specifying points for identifying the desired regions can be inputted at this step 52, irrespective of the shape of the figure.

Then, at the step 60, the rotation angle by which the figure element is to be rotated is inputted from the position data input unit 3, along with a position coordinate for a center of rotation.

Then, at the step 61, the figure element identified by the position coordinate inputted at the step 52 is extracted by the image modification unit 6, and then, at the step 62, the figure element extracted at the step 61 is rotated by the image modification unit 6 according to the rotation angle and the position coordinate for the center of rotation inputted at the step 60.

Figure 27:
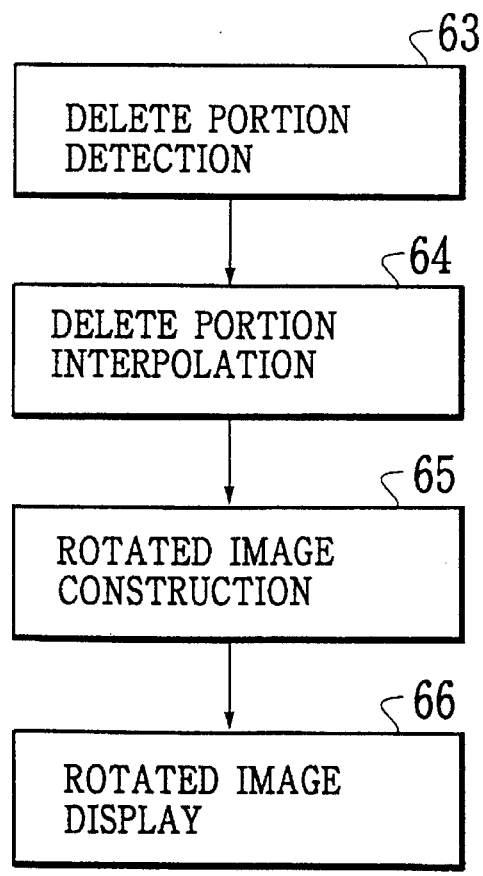
FIG. 27 is a flow chart for the operation to be carried out by the system of FIG. 1 at a figure element rotation step in the overall procedure of FIG. 26.

More specifically, the rotation of the figure element by the image modification unit 6 is carried out according to the flow chart of FIG. 27 as follows.

Figure 28A:
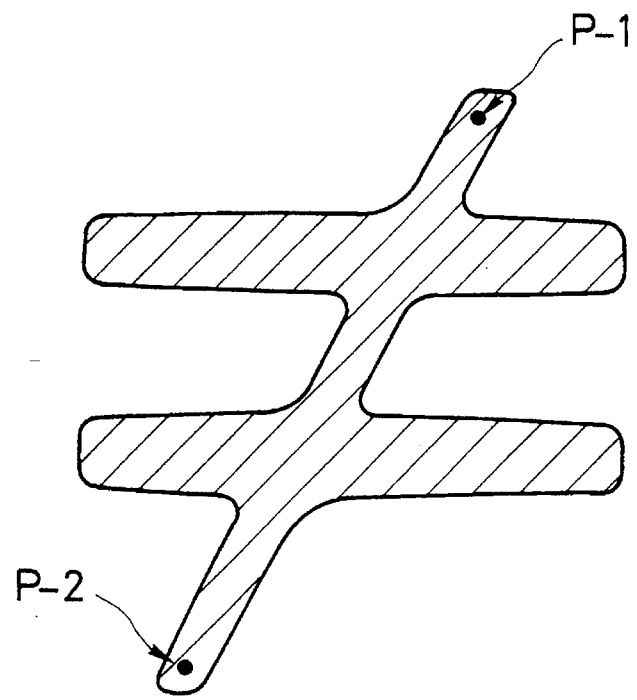
FIGS. 28A to 28F are illustrations of an exemplary image of a figure during the rotation operation according to the flow chart of FIG. 26.
Figure 28B:
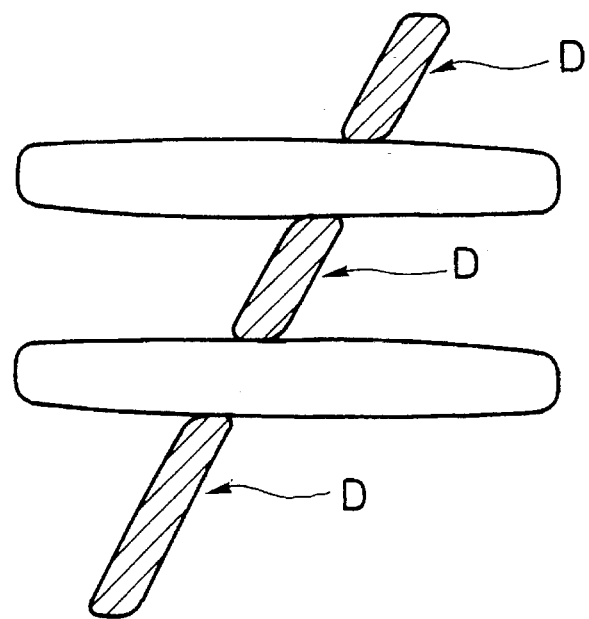

Namely, first at the step 63, the delete portions D to be deleted from the original image when the figure element specified at the step 59 is rotated are detected in the manner of the deletion operation described above. Thus, for the original image of the figure shown in FIG. 28A with the target specifying points P-1 and P-2 identifying the oblique line segment to be rotated, the delete portions D indicated in FIG. 28B are detected at this step 63. Here, it is to be noted that the different manner of achieving the detection of the delete portions D of the figure element may be adopted, if desired.

Figures 28C, 28D, 28E:
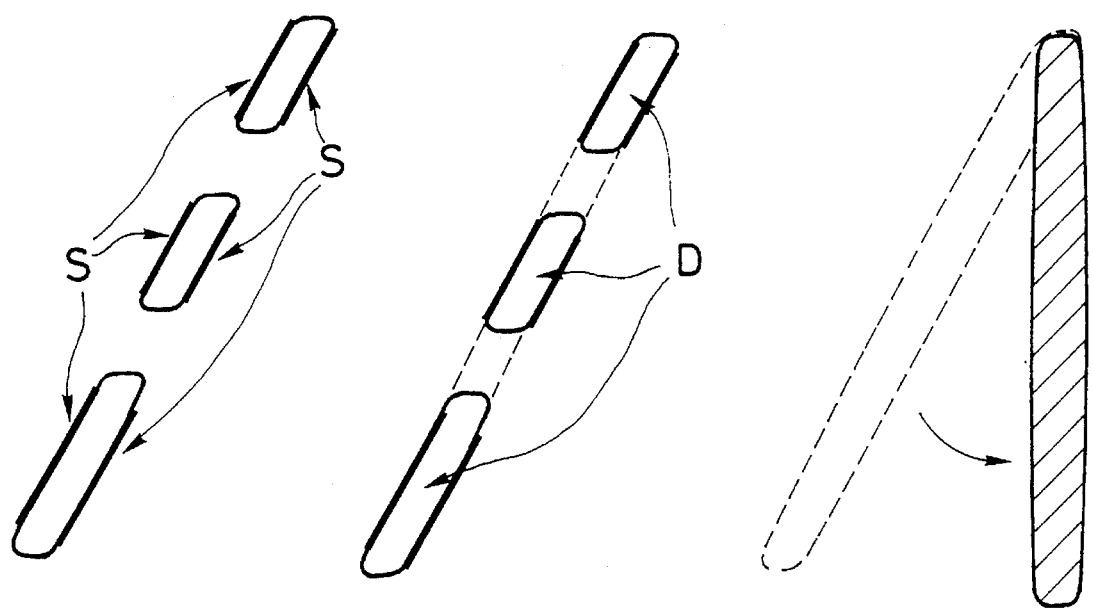

Then, at the step 64, the delete portions D detected at the step 63 are interpolated to form a single continuous figure element. Here, the interpolation is carried out by detecting the straight line segments S of the delete portions D as shown in FIG. 28C, and then forming a single closed figure by interpolating between each neighboring straight line segments S as shown in FIG. 28D. The interpolation can be realized by connecting the end points of the neighboring straight line segments S, or by connecting the point sequences on the contour line obtained by the characteristic extraction unit 2.

Then, at the step 65, the rotated image is constructed by rotating the interpolated figure element obtained at the step 64 according to the rotation angle and the position coordinate for the center of rotation inputted at the step 60, as shown in FIG. 28E.

Figure 28F:
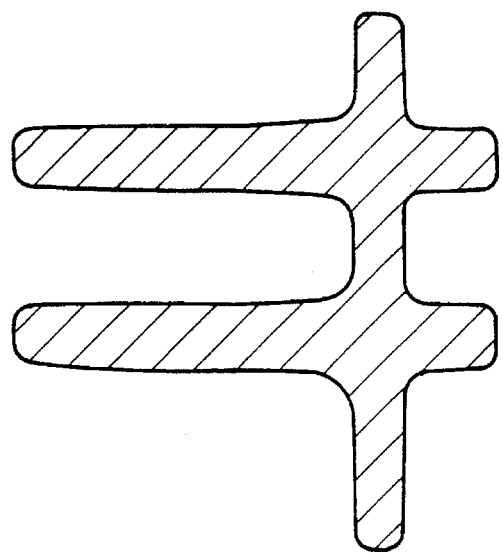

Then, at the step 66, the delete portions D are deleted from the display on the display unit 10 while the rotated image constructed at the step 65 is displayed along with the undeleted portions of the figure, as shown in FIG. 28F.

It is to be noted here that, in the above described operation for the displacement, the delete portions D can be deleted from the display on the display unit 10 by changing the corresponding image data stored in the frame memory provided in the display control unit 7 from binary 1 to binary 0 or by replacing black data by white data. Similarly, the displaced figure element can be displayed at the displacement target position on the display of the display unit 10 by changing the corresponding image data stored in the frame memory provided in the display control unit 7 from binary 1 to binary 0 or by replacing white data by black data.

<<Extension>>

Figure 29:
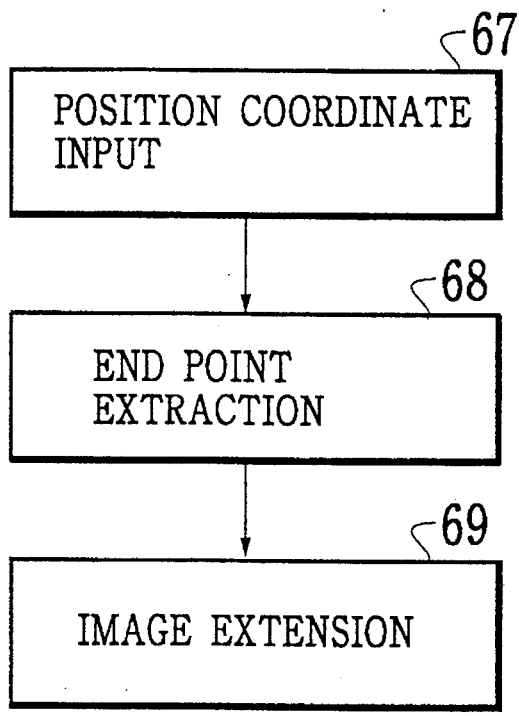
FIG. 29 is a flow chart of an overall procedure for the operation to be carried out by the system of FIG. 1 in a case of an extension operation.

Next, FIG. 29 shows a flow chart for the operations in a case of the extension.

In this case, first at the step 67, the position coordinate for a target specifying point indicating a desired portion to be extended in the figure is inputted from the position data input unit 3 as the input position data.

Then, at the step 68, the end point of the desired portion to be extended indicated by the target specifying point specified at the step 67 is extracted by the feature determination unit 5, in the manner of the end point measurement operation described above.

Then, at the step 69, the image extension operation to construct the image of the figure with the desired portion extended is carried out according to the end point extracted at the step 68 by the image modification unit 6.

Figure 30:
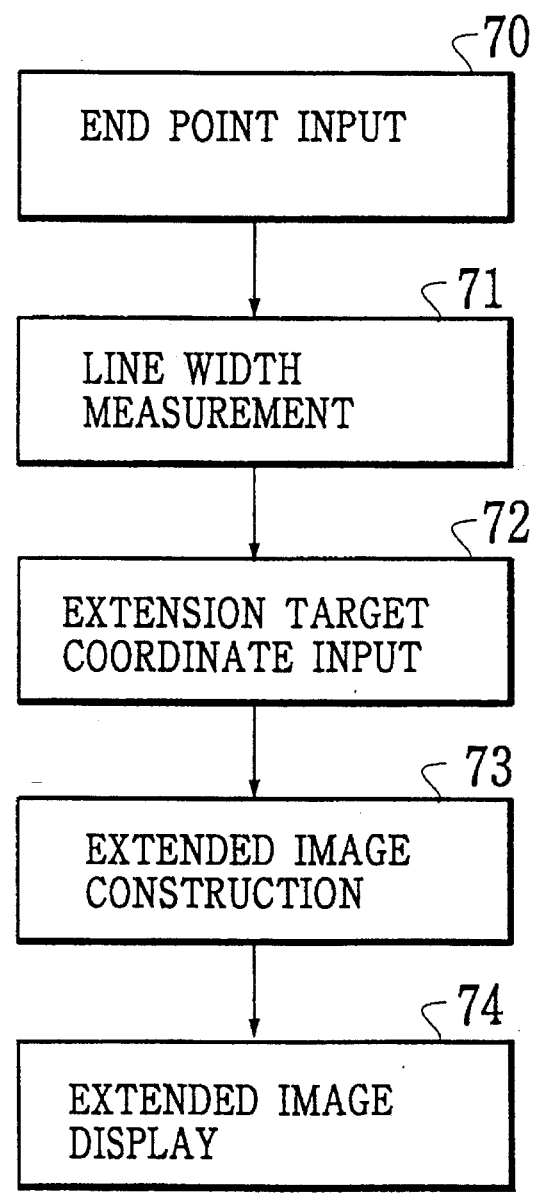
FIG. 30 is a flow chart for the operation to be carried out by the system of FIG. 1 at an image extension step in the overall procedure of FIG. 29.

More specifically, the image extension operation by the image modification unit 6 is carried out according to the flow chart of FIG. 30 as follows.

Namely, first at the step 70, the position coordinate of the end point extracted at the step 68 is inputted from the feature determination unit 5 to the image modification unit 6.

Then, at the step 71, the line width of the desired portion to be extended is measured by the feature determination unit 5 in the manner of the line width measurement described above and inputted into the image modification unit 6.

Figure 31A:
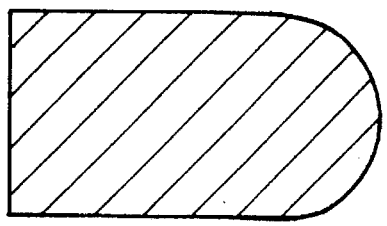
FIGS. 31A to 31D are illustrations of an exemplary image of a figure during the extension operation according to the flow chart of FIG. 29.
Figure 31B:
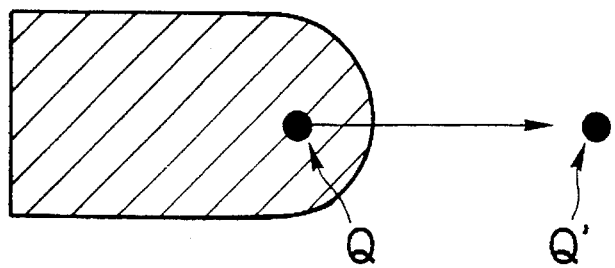

Then, at the step 72, the position coordinate for the extension target position is inputted from the position data input unit 3. Here, for the original image of the desired portion as shown in FIG. 31A, the extension target position Q' with respect to the original end point Q can be specified as shown in FIG. 31B.

Figure 31C:
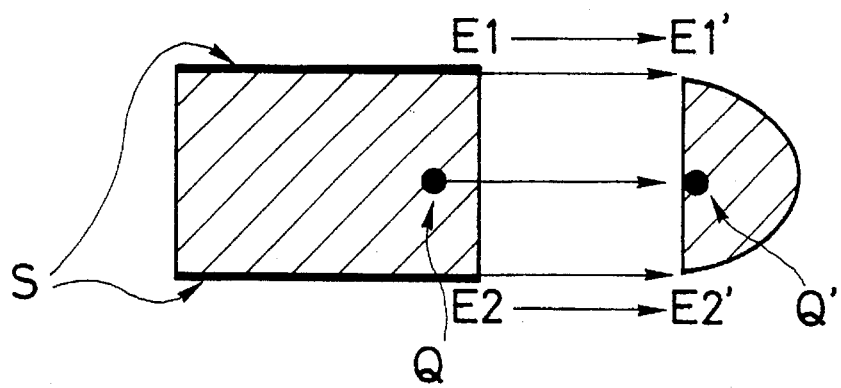
Figure 31D:
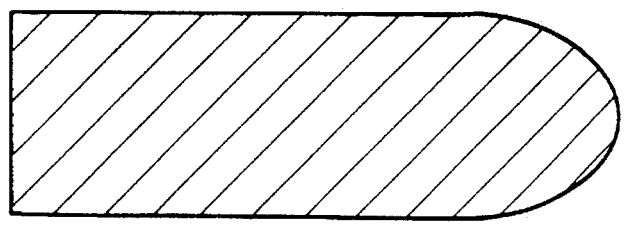

Then, at the step 73, the extended image having the extension target position inputted at the step 72 as a new end point is constructed as shown in FIG. 31C. Namely, the straight line segments S of the desired portion in a vicinity of the original end point Q are detected. Then, these straight line segments S are extended from their end points E1 and E2 closer to the original end point Q for a distance between the original end point Q and the new end point Q' to form new end points E1' and E2', and the contour line point sequences located between the end points E1 and E2 are parallelly transported for the distance between the original end point Q and the new end point Q'. Then, the portion enclosed by the extended straight line segments S and the parallelly transported contour line point sequences is painted out to obtain the extended image as shown in FIG. 31D.

Here, it is to be noted that the different manner of achieving the construction of the extended image may be adopted, if desired.

Then, at the step 74, the image data of the desired portion to be extended in the figure stored in the frame memory provided in the display control unit 7 are updated by the image data of the extended image constructed at the step 73, and the extended image constructed at the step 73 is displayed on the display unit 10 along with the remaining portions of the figure.

It is to be noted here that, in the above described operation for the extension, the updating of the image data can be achieved by changing the corresponding image data stored in the frame memory provided in the display control unit 7 from binary 1 to binary 0 or by replacing white data by black data.

<<Expansion/Contraction>>

Figure 32:
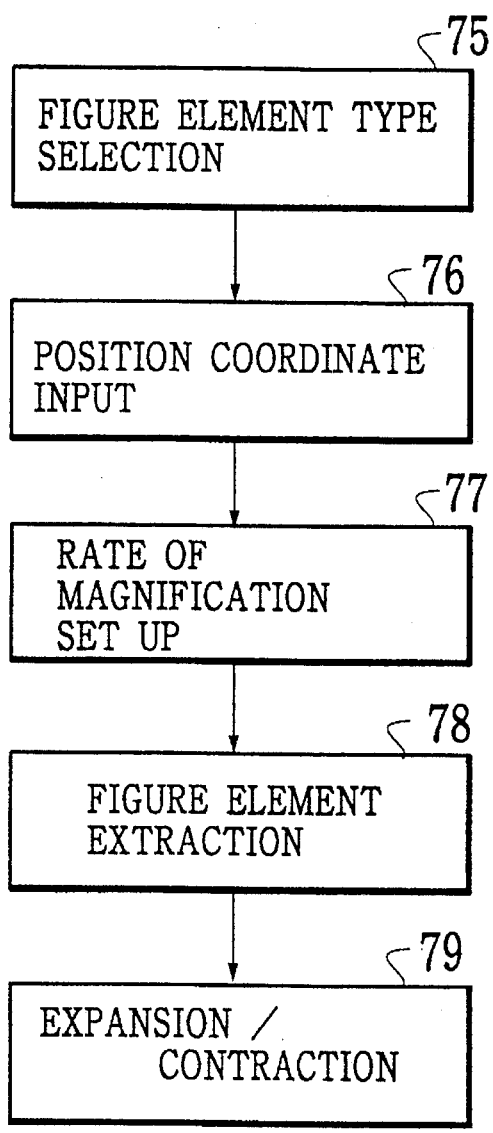
FIG. 32 is a flow chart of an overall procedure for the operation to be carried out by the system of FIG. 1 in a case of an expansion/contraction operation.

Next, FIG. 32 shows a flow chart for the operations in a case of the expansion or the contraction.

In this case, first at the step 75, the type of the figure element to be deleted is selected by operating the input device 1 on the figure element type menu shown in FIG. 20 described above which is displayed on the display unit 10.

Then, at the step 76, the position coordinate for appropriate number of target specifying points are inputted from the position data input unit 3 as the input position data. Here, again, when the selected figure element type is the straight line, two target specifying points for identifying the straight line to be deleted can be required, whereas when the selected figure element type is a circle, one or more points target specifying points on the circle can be required. A different number of target specifying points may be required for any figure element type, if desired. Also, in a case of selecting the region in the figure element type menu of FIG. 20, the target specifying points for identifying the desired regions can be inputted at this step 52, irrespective of the shape of the figure.

Then, at the step 77, the rate of magnification by which the figure element is to be expanded or contracted is inputted from the input device 1.

Then, at the step 78, the figure element identified by the position coordinate inputted at the step 76 is extracted by the image modification unit 6, and then, at the step 79, the figure element extracted at the step 78 is expanded or contracted by the image modification unit 6 according to the rate of magnification inputted at the step 77.

Figure 33:
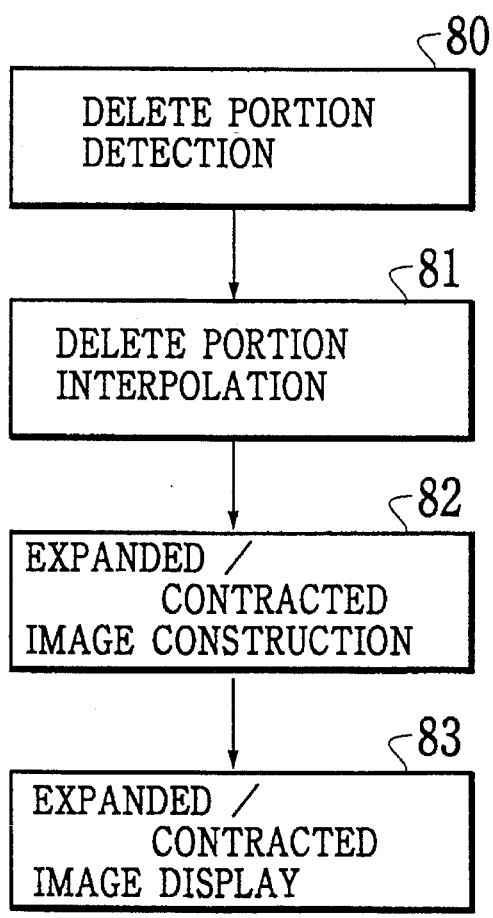
FIG. 33 is a flow chart for the operation to be carried out by the system of FIG. 1 at an expansion/contraction step in the overall procedure of FIG. 32.

More specifically, the expansion or the contraction of the figure element by the image modification unit 6 is carried out according to the flow chart of FIG. 33 as follows.

Figure 34A:
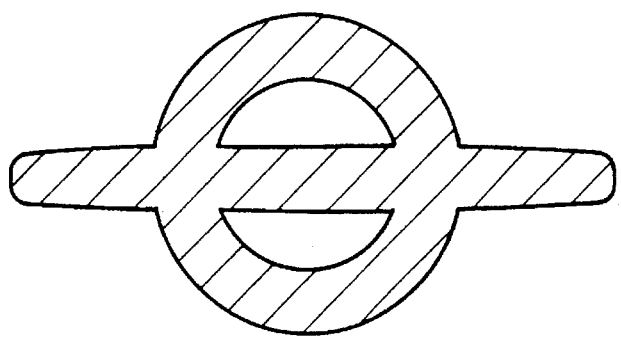
FIGS. 34A to 34E are illustrations of an exemplary image of a figure during the expansion/contraction operation according to the flow chart of FIG. 32.
Figure 34C:
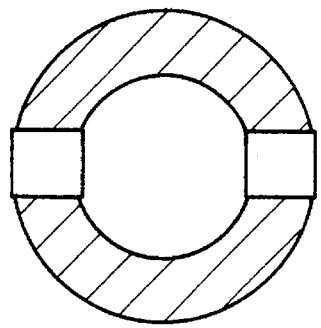
Figure 34B:
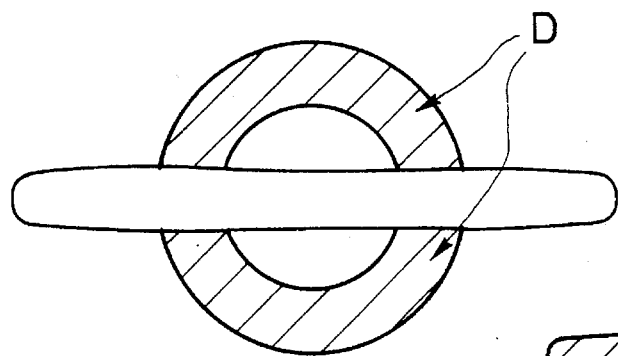

Namely, first at the step 80, the delete portions D to be deleted from the original image when the figure element specified at the step 76 is expanded or contracted are detected in the manner of the deletion operation described above. Thus, for the original image of the figure shown in FIG. 34A in which the circle segment is to be expanded or contracted, the delete portions D indicated in FIG. 34B are detected at this step 80. Here, it is to be noted that the different manner of achieving the detection of the delete portions D of the figure element may be adopted, if desired.

Then, at the step 81, the delete portions D detected at the step 80 are interpolated to form a single continuous figure element to be expanded or contracted. Here, the interpolation can be the straight line interpolation between the end points of the delete portions D as shown in FIG. 34C.

Then, at the step 82, the interpolated figure element obtained at the step 81 is expanded or contracted according to the rate of magnification inputted at the step 77 to obtain the expanded/contracted image.

Figure 34D:
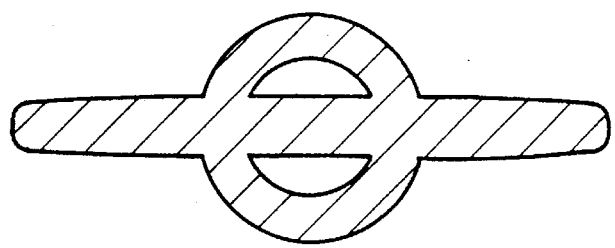
Figure 34E:
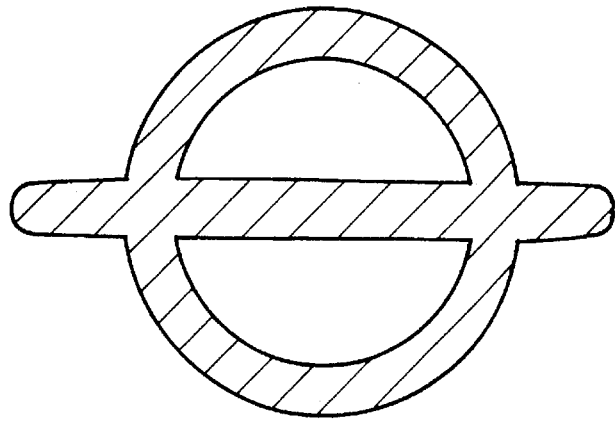

Then, at the step 83, the delete portions D are deleted from the display on the display unit 10 while the expanded/contracted image constructed at the step 82 is displayed along with the undeleted portions of the figure, as shown in FIG. 34D for a case of contraction, and as shown in FIG. 34E for a case of expansion. Also, the image data of the expanded/contracted figure element in the figure stored in the frame memory provided in the display control unit 7 are updated by the image data of the expanded/contracted image constructed at the step 82.

It is to be noted here that, in a case of selecting the region in the figure element type menu of FIG. 20 at the step 75, the selected region can be expanded or contracted in the similar manner.

It is also to be noted that, the contraction and the expansion shown in FIGS. 34D and 34E are those in which the line width of the figure element to be expanded or contracted is unchanged, but it is also possible to adopt the manner of expansion and the contraction in which the line width of the figure element to be expanded or contracted is also expanded or contracted. On the other hand, in order to maintain the line width of the figure element to be expanded or contracted, it is also possible to adopt the manner of expansion and the contraction in which the thinned image is expanded or contracted and then the expanded or contracted thinned image is thickened so as to maintain the same line width before and after the expansion or the contraction.

<<Line width change>>

Figure 35:
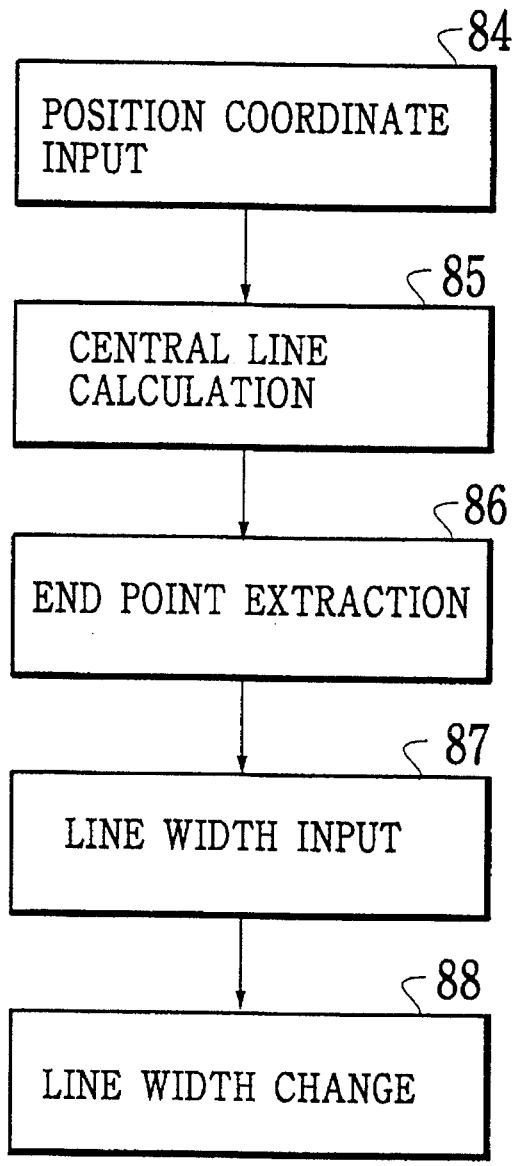
FIG. 35 is a flow chart of an overall procedure for the operation to be carried out by the system of FIG. 1 in a case of a line width change operation.

Next, FIG. 35 shows a flow chart for the operations in a case of the line width change.

Figure 37A:
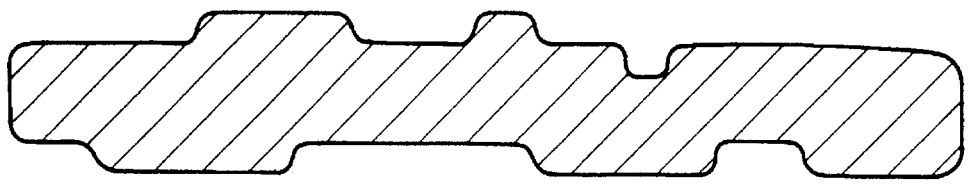
FIGS. 37A to 37C are illustrations of an exemplary image of a figure during the line width change operation according to the flow chart of FIG. 35.
Figure 37B:
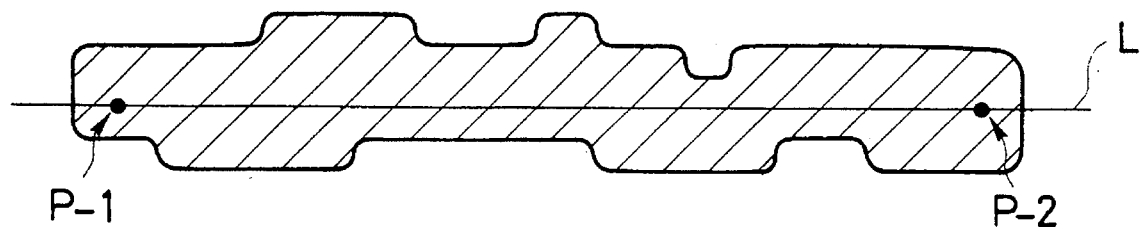

In this case, first at the step 84, the position coordinate for target specifying points indicating a desired portion whose line width is to be changed in the figure is inputted from the position data input unit 3 as the input position data. For example, for the original image of the figure shown in FIG. 37A whose line width is to be changed, the target specifying points P-1 and P-2 as shown in FIG. 37B can be specified.

Then, at the step 85, the pair of parallel straight line segments in the desired portion specified at the step 84 is detected, and a central line is calculated from the contour line point sequences of the detected straight line segments. For the figure shown in FIG. 37A, the central line L as shown in FIG. 37B is obtained at this step 85. Here, it is to be noted that the different manner of achieving the calculation of the central line may be adopted, if desired.

Then, at the step 86, the end points of the desired portion specified at the step 84 are extracted by the feature determination unit 5, in the manner of the end point measurement operation described above, in order to determine the end points of the portion at which the line width is to be changed.

Then, at the step 87, the new line width to which the line width of the desired portion specified at the step 84 is to be changed is inputted from the input device 1 by specifying an indication on the display of the display unit 10. Here, the new line width may be specified numerically instead, if desired.

Finally, at the step 88, the line width change operation to construct the image of the figure with the line width of the desired portion specified at the step 84 changed to the new line width inputted at the step 87 is carried out by the image modification unit 6, according to the central line obtained at the step 85 and the end points obtained at the step 86.

In the procedure of the line width change described above, the order of the step 85, the step 86, and the step 87, may be interchanged, if desired.

Figure 36:
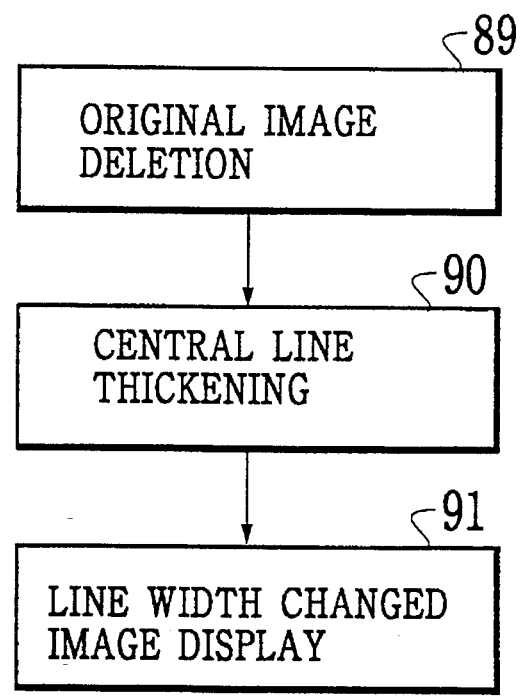
FIG. 36 is a flow chart for the operation to be carried out by the system of FIG. 1 at a line width change step in the overall procedure of FIG. 35.

More specifically, the line width change operation by the image modification unit 6 is carried out according to the flow chart of FIG. 36 as follows.

Namely, first at the step 89, the original image of the desired portion specified at the step 84 is deleted from the display on the display unit 10.

Figure 37C:
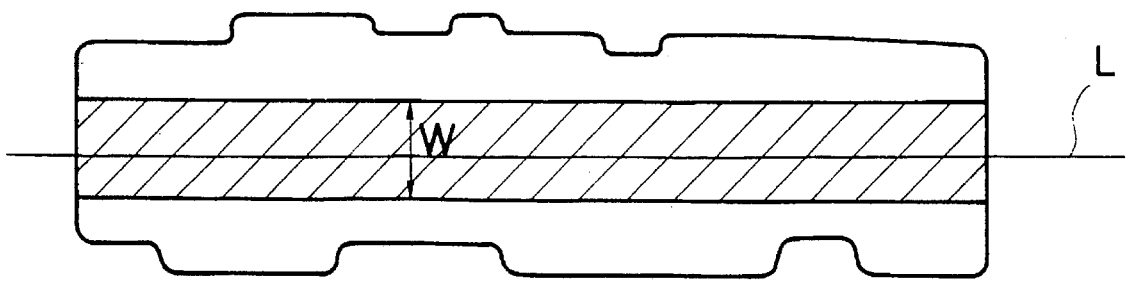

Then, at the step 90, the central line L obtained at the step 85 bounded at the end points obtained at the step 86 is thickened to the new line width W specified at the step 87, by thickening the central line L for a thickness of W/2 toward above and a thickness of W/2 toward below, as shown in FIG. 37C. It is to be noted here that the different manner of achieving the thickening of the central line may be adopted, if desired. For example, it is possible to adopt the manner in which the outer circumference portion of the desired portion can be thickened or thinned by adding or removing one picture element at each point on the outer circumference portion.

Finally, at the step 91, the line width changed image of the desired portion specified at the step 84 with the line width changed to the new line width W is displayed on the display unit 10. Also, the image data of the desired portion in the figure stored in the frame memory provided in the display control unit 7 are updated by the image data of the line width changed image constructed at the step 90.

It is noted here that, the reduction of the line width can be achieved in a similar manner, by forming the line width changed image at the step 91 by removing the thickened central line obtained at the step 90 from the desired portion of the original image specified at the step 84.

<<Connection>>

Figure 38:
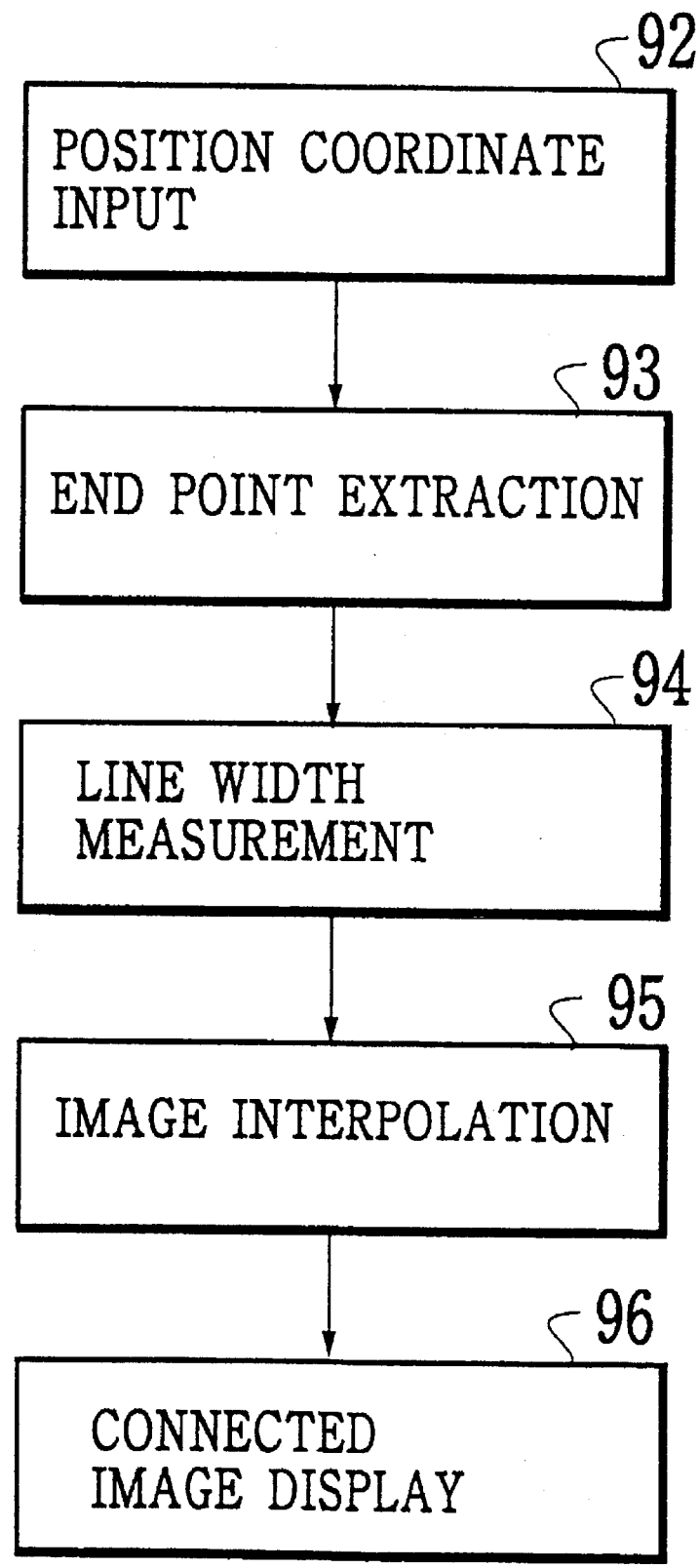
FIG. 38 is a flow chart of an overall procedure for the operation to be carried out by the system of FIG. 1 in a case of a connection operation.

Next, FIG. 38 shows a flow chart for the operations in a case of the connection.

In this case, first at the step 92, the position coordinate for two target specifying points indicating desired portions to be connected with each other in the figure are inputted from the position data input unit 3 as the input position data.

Figure 39A:
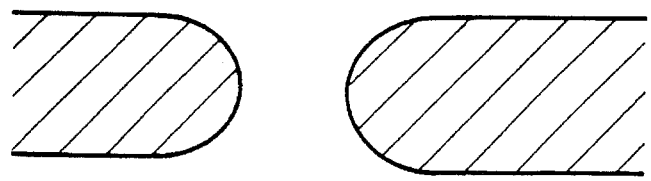
FIGS. 39A to 39C are illustrations of an exemplary image of a figure during the connection operation according to the flow chart of FIG. 38.
Figure 39B:
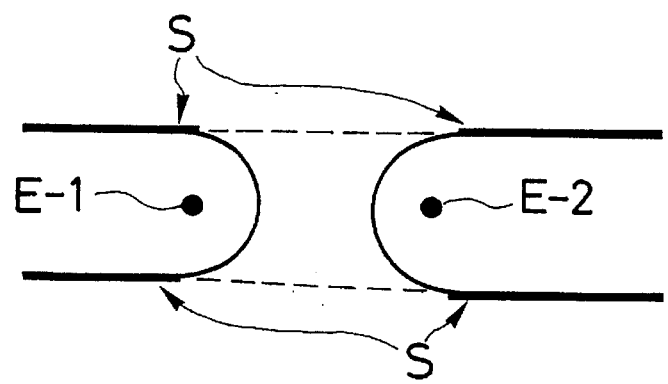

Then, at the step 93, the end points of the desired portions specified at the step 92 are detected by the feature determination unit 5 in the manner of the end point measurement described above. For example, for the original image of the desired portions to be connected shown in FIG. 39A, the end points E-1 and E-2 as shown in FIG. 39B are obtained at this step 93.

Then, at the step 94, the line width of each of the desired portions specified at the step 92 is measured by the feature determination unit 5 in the manner of the line width measurement described above.

Figure 39C:
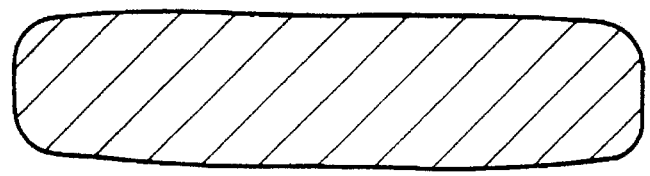

Then, at the step 95, the end points E-1 and E-2 obtained at the step 93 are connected, and the image interpolation to produce the interpolating image between the desired portions with the thickness equal to an average of the line widths obtained at the step 94 is carried out by the image modification unit 6 to obtain the connected image as shown in FIG. 39C. It is to be noted here that the image interpolation may be carried out by connecting the straight line segments S in the vicinity of the end points E-1 and E-2 as indicated by the dashed lines in FIG. 39B instead. Also, at this point, the line width of the interpolating image may be changed to any desired line width by using the line width change operation described above.

Finally, at the step 96, the connected image as shown in FIG. 39C constructed at the step 95 is displayed on the display unit 10.

It is to be noted here that, instead of producing the interpolating image to connect the desired portions as described above, the connected image may be obtained by detecting the desired portions, extracting the features of the desired portions such as their positions, end points, lengths, directions, and line widths, and then deleting the original images of the desired portion while generating the connected image.

<<Smoothing>>

Figure 40:
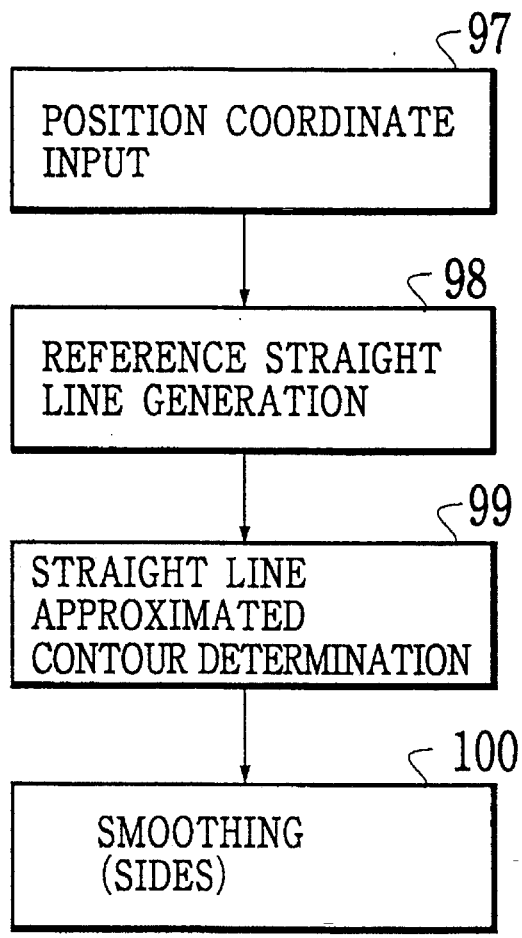
FIG. 40 is a flow chart of an overall procedure for the operation to be carried out by the system of FIG. 1 in a case of a smoothing operation for sides of the figure.

Next, FIG. 40 shows a flow chart for the operations in a case of the smoothing of the sides of the figure.

In this case, first at the step 97, the position coordinate For two target specifying points indicating desired portions whose sides are to be smoothed in the figure are inputted from the position data input unit 3 as the input position data. For example, for the original image of the figure shown in FIG. 41A, the target specifying points P-1 and P-2 as indicated in FIG. 42A are specified at this step 97 in order to identify the desired portion to be smoothed as a block section containing these target specifying points P-1 and P-2.

Figure 41A:
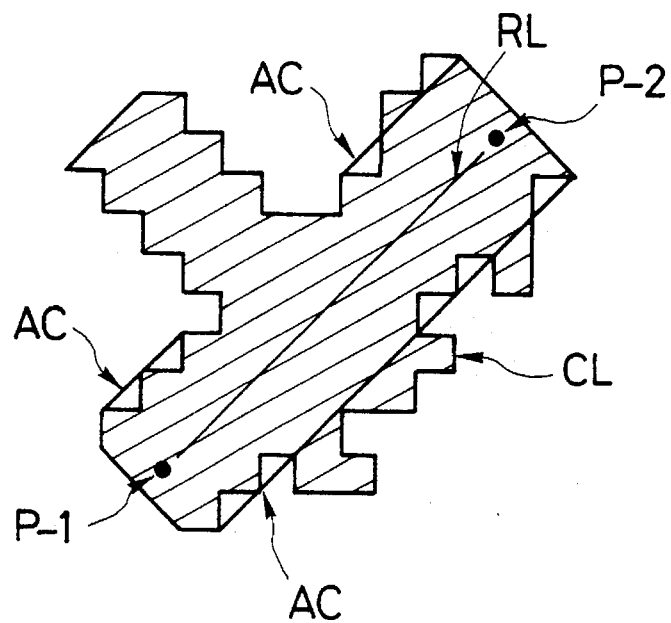
FIGS. 41A and 41B are illustrations of an exemplary image of a figure during the smoothing operation according to the flow chart of FIG. 40.

Then, at the step 98, a reference straight line RL joining the two target specifying points P-1 and P-2 specified at the step 97 as shown in FIG. 41A is generated by the image modification unit 8, using the preliminary processing data obtained at the characteristic extraction unit 2.

Then, at the step 99, straight line approximated contour lines AC on the sides of the desired portion specified at the step 97 as shown in FIG. 41A are determined by the image modification unit 6 as the straight line segments parallel to the reference straight line RL obtained at the step 98.

Figure 41B:
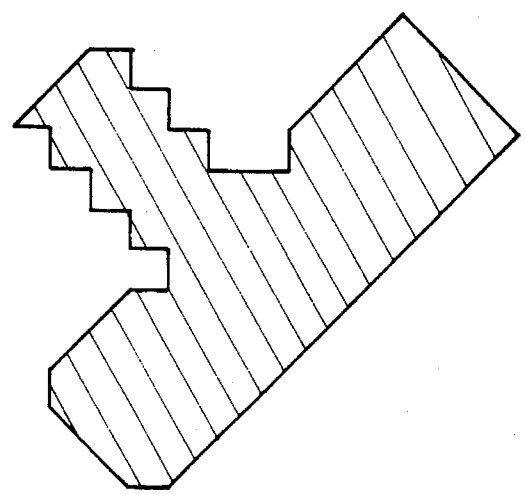

Then, at the step 100, the smoothing of the sides of the desired portion specified at the step 97 is carried out by the image modification unit 6 by adding picture elements to those portions located inside the straight line approximated contour lines AC which are not located inside the original contour line CL, and removing the picture elements from those portions located outside of the straight line approximated contour lines AC which are located inside the original contour line CL, so as to obtained the smoothed image as shown in FIG. 41B.

Figure 42:
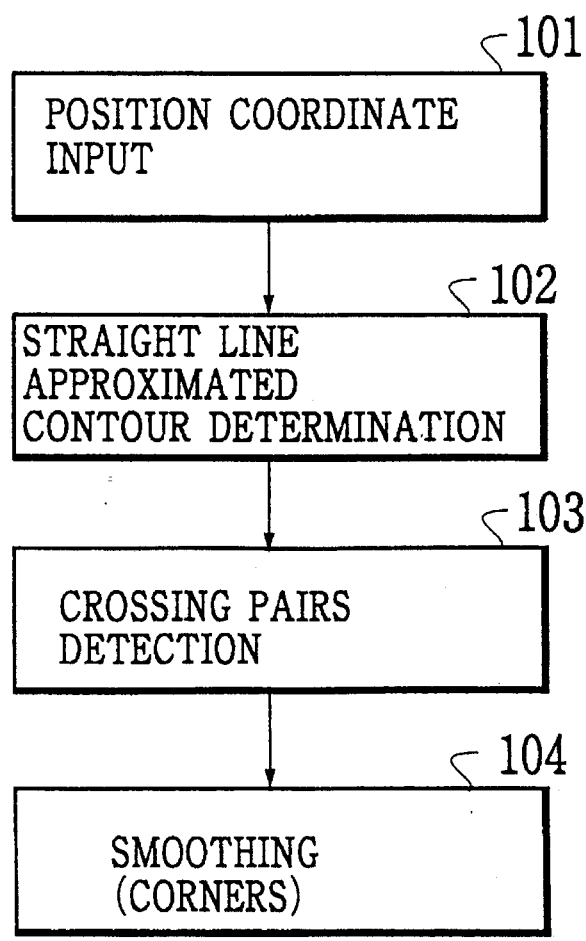
FIG. 42 is a flow chart of an overall procedure for the operation to be carried out by the system of FIG. 1 in a case of a smoothing operation for a corner of the figure.

On the other hand, FIG. 42 shows a flow chart for the operations in a case of the smoothing of the corners of the figure.

In this case, first at the step 101, the position coordinate for a target specifying point indicating desired corner portion to be smoothed in the figure is inputted from the position data input unit 3 as the input position data. For example, for the original image of the figure shown in FIG. 43A, the target specifying point P as indicated in FIG. 43A is specified at this step 101 in order to identify the desired corner portion to be smoothed.

Figure 43A:
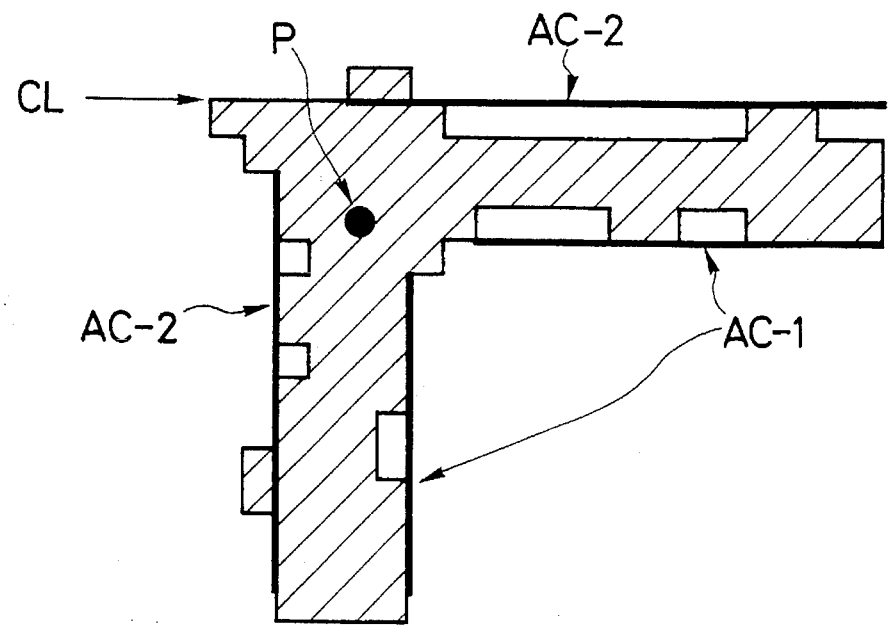
FIGS. 43A and 43B are illustrations of an exemplary image of a figure during the smoothing operation according to the flow chart of FIG. 42.

Then, at the step 102, straight line approximated contour lines AC-1 and AC-2 in a vicinity of the desired corner portion specified at the step 101 as shown in FIG. 43A are determined by the image modification unit 6, using the preliminary processing data obtained at the characteristic extraction unit 2.

Then, at the step 103, a crossing pair of the straight line approximated contour lines AC-1 which are crossing at the desired corner portion and another crossing pair of the straight line approximated contour lines AC-2 which are also crossing at the desired corner portion are detected among the straight line approximated contour lines AC-1 and AC-2.

Figure 43B:
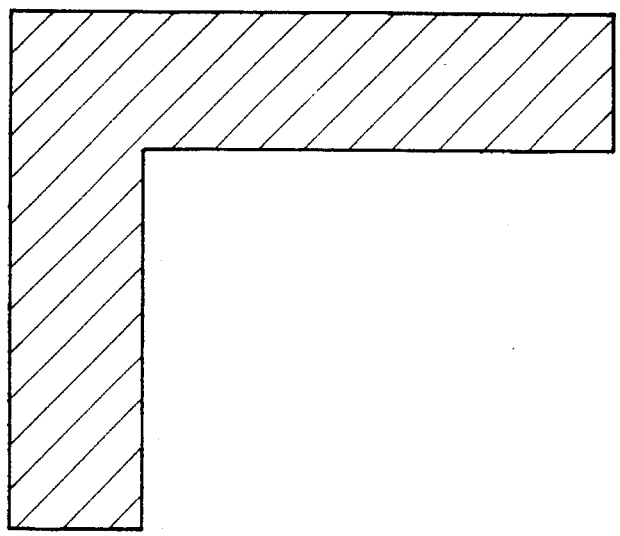

Then, at the step 104, the smoothing of the desired corner portion specified at the step 101 is carried out by the image modification unit 6 by adding picture elements to those portions located inside the straight line approximated contour lines AC-1 and AC-2 which are not located inside the original contour line CL, and removing the picture elements from those portions located outside of the straight line approximated contour lines AC-1 and AC-2 which are located inside the original contour line CL, so as to obtained the smoothed image as shown in FIG. 43B.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An image figure editing system for manipulating figure elements of a figure to be edited given in terms of image data, comprising:

position data input means for inputting position data to specify the figure elements to be operated in the image data of the figure;

operation mode specifying means for specifying operation modes, each operation mode indicating one of operations applicable to the image data of the figure which include measurement operations and editing operations;

characteristic extraction means for extracting characteristics indicative of a shape of the figure from the image data of the figure;

feature determination means for determining features indicative of a configuration of the image data of the figure according to the characteristics extracted by the characteristic extraction means, by carrying out a measurement operation indicated by the operation mode specified at the operation mode specifying means to the image data of the figure elements specified by the position data inputted at the position data input means; and image modification means for modifying an image of the figure according to the features determined by the feature determination means and the characteristics extracted by the characteristic extraction means, by carrying out an editing operation indicated by the operation mode specified by the operation mode specifying means to the figure elements specified by the position data inputted by the position data input means.

2. The system of claim 1, wherein the characteristics extracted by the characteristic extraction means include preliminary processing data indicative of an overall shape of the figure and characteristic point sequences indicative of curved portions of the figure.

3. The system of claim 1, wherein the operation to be carried out by the feature determination means include at least one of measurement operations for an end point, a bending point, an intersection point, a line width, a line center, and an inclination angle, such that the features determined by the feature determination means include at least one of the end point, the bending point, the intersection point, the line width, the line center, and the inclination angle.

4. The system of claim 3, wherein the characteristics extracted by the characteristic extraction means include at least one of preliminary processing data indicative of an overall shape of the figure and characteristic point sequences indicative of curved portions of the figure, and any one of the end point, the bending point, the intersection point, the line width, the line center, and the inclination angle is measured from at least one of the characteristic point sequences and straight line segments in the figure indicated by the preliminary processing data.

5. A method of image figure editing for manipulating figure elements of a figure to be edited given in terms of image data, comprising the steps of:

inputting position data to specify the figure elements to be operated in the image data of the figure;

specifying operation modes, each operation mode indicating one of operations applicable to the image data of the figure which include measurement operations and editing operations;

extracting characteristics indicative of a shape of the figure from the image data of the figure; and determining features indicative of a configuration of the image data of the figure according to the characteristics extracted at the extracting step, by carrying out a measurement operation indicated by the operation mode specified at the specifying step to the image data o the figure elements specified by the position data inputted at the inputting step; and modifying an image of the figure according to the features determined at the determining step and the characteristics extracted at the extracting step, by carrying out an editing operation indicated by the operation mode specified at the specifying step to the figure elements specified by the position data inputted at the inputting step.

6. The system of claim 5, wherein the operation to be carried out by the image modification means include at least one of editing operations of a deletion, a displacement, a line width change, a rotation, an extension, an expansion, a contraction, a connection, and a smoothing.

7. The system of claim 6, wherein the characteristics extracted by the characteristic extraction means include characteristic point sequences indicative of curved portions of the figure, and the deletion of a target figure element to be deleted is realized by detecting the characteristic point sequences along the target figure element, generating cutting line segments for the target figure element at the detected characteristic point sequences to form connected figure elements crossing the target figure element, and deleting isolated portions of the target figure element resulting from the generated cutting line segments.

8. The system of claim 6, wherein the characteristics extracted by the characteristic extraction means include characteristic point sequences indicative of curved portions of the figure, and any one of the displacement, the rotation, the expansion, and the contraction is realized by detecting the characteristic point sequences along a target figure element to be operated, interpolating the target figure element at the detected characteristic point sequences, applying an appropriate editing operation of any one of the displacement, the rotation, the expansion, and the contraction on the interpolated target figure element, and deleting an original image of the target figure element while adding a modified image of the target figure element applied with the appropriate editing operation.

9. The system of claim 6, wherein the features determined by the feature determination means include a line width and an end point, and any one of the extension, the line width change, and the connection is realized by generating a modifying portion for each target figure element to be operated according to the line width and the end point of each target figure element which are determined by the feature determination means.

10. The system of claim 6, wherein the characteristics extracted by the characteristic extraction means include preliminary processing data indicative of an original contour line of the figure, and the smoothing is realized by generating straight line approximated contour lines of a target figure element to be smoothed according to the preliminary processing data, and adding picture elements to those portions of the target figure element which are located inside of the generated straight line approximated contour lines and outside of the original contour line while deleting picture elements from those portions of the target figure element which are located outside of the generated straight line approximated contour lines and inside of the original contour line.

11. The method of claim 5, wherein the characteristics extracted at the extracting step include preliminary processing data indicative of an overall shape of the figure and characteristic point sequences indicative of curved portions of the figure.

12. The method of claim 5, wherein the operation to be carried out at the determining step include at least one of measurement operations for an end point, a bending point, an intersection point, a line width, a line center, and an inclination angle, such that the features determined at the determining step include at least one of the end point, the bending point, the intersection point, the line width, the line center, and the inclination angle.

13. The method of claim 12, wherein the characteristics extracted at the extracting step include at least one of preliminary processing data indicative of an overall shape of the figure and characteristic point sequences indicative of curved portions of the figure, and any one of the end point, the bending point, and the intersection point, the line width, the line center, and the inclination angle is measured-from at least one of the characteristic point sequences and straight line segments in the figure indicated by the preliminary processing data.

14. The method of claim 5, wherein the operation to be carried out at the modifying step include at least one of editing operations of a deletion, a displacement, a line width change, a rotation, an extension, an expansion, a contraction, a connection, and a smoothing.

15. The method of claim 14, wherein the characteristics extracted at the extracting step include characteristic point sequences indicative of curved portions of the figure, and the deletion of a target figure element to be deleted is realized by detecting the characteristic point sequences along the target figure element, generating cutting line segments for the target figure element at the detected characteristic point sequences to form connected figure elements crossing the target figure element, and deleting isolated portions of the target figure element resulting from the generated cutting line segments.

16. The method of claim 14, wherein the characteristics extracted at the extracting step include characteristic point sequences indicative of large curvature portions of the figure, and any one of the displacement, the rotation, the expansion, and the contraction is realized by detecting the characteristic point sequences along a target figure element to be operated, interpolating the target figure element at the detected characteristic point sequences, applying an appropriate editing operation of any one of the displacement, the rotation, the expansion, and the contraction on the interpolated target figure element, and deleting an original image of the target figure element while adding a modified image of the target figure element applied with the appropriate editing operation.

17. The method of claim 14, wherein the features determined at the determining step include a line width and an end point, and any one of the extension, the line width change, and the connection is realized by generating a modifying portion for each target figure element to be operated according to the line width and the end point of each target figure element which are determined at the determining step.

18. The method of claim 14, wherein the characteristics extracted at the extracting step include preliminary processing data indicative of an original contour line of the figure, and the smoothing is realized by generating straight line approximated contour lines of a target figure element to be smoothed according to the preliminary processing data, and adding picture elements to those portions of the target figure element which are located inside of the generated straight line approximated contour lines and outside of the original contour line while deleting picture elements from those portions of the target figure element which are located outside of the generated straight line approximated contour lines and inside of the original contour line.

* * * * *